United States Patent [19]

Mishima et al.

[11] Patent Number: 4,514,216
[45] Date of Patent: Apr. 30, 1985

[54] ACICULAR FERROMAGNETIC ALLOY PARTICLES FOR MAGNETIC RECORDING AND PROCESS FOR PRODUCING THE SAME

[75] Inventors: Akio Mishima; Yoshiro Okuda; Tosiharu Harada; Akira Mukaizaka; Tomoyuki Imai, all of Hiroshima, Japan

[73] Assignee: Toda Kogyo Corp., Hiroshima, Japan

[21] Appl. No.: 573,489

[22] Filed: Jan. 24, 1984

[30] Foreign Application Priority Data

Apr. 30, 1983 [JP] Japan .................................. 58-77166
May 31, 1983 [JP] Japan .................................. 58-98506

[51] Int. Cl.³ .......................... H01F 1/09; H01F 1/33
[52] U.S. Cl. ............................. 75/0.5 AA; 148/31.55; 148/105; 75/251
[58] Field of Search ............. 75/0.5 AA, 0.5 BA, 251; 148/105, 31.55

[56] References Cited

U.S. PATENT DOCUMENTS 4,305,753 12/1981 French .............................. 148/105
4,318,735 3/1982 Mishima et al. ................... 148/105
4,318,757 3/1982 Horimoto .......................... 148/105

Primary Examiner—W. Stallard
Attorney, Agent, or Firm—Lyon & Lyon

[57] ABSTRACT

Disclosed herein is acicular ferromagnetic alloy particles for magnetic recording, containing Si, Cr, Ni and P and optionally Mg impregnated with phosphorus compound and silicon compound and process for producing the same.

6 Claims, 10 Drawing Figures (x 20000)

(x 20000)

( x 20000 )

( x 20000 )

(× 20000)

(× 20000)

ACICULAR FERROMAGNETIC ALLOY PARTICLES FOR MAGNETIC RECORDING AND PROCESS FOR PRODUCING THE SAME

BACKGROUND OF THE INVENTION

The present invention relates to acicular ferromagnetic alloy particles containing Si, Cr, Ni and P and optionally containing Mg impregnated with phosphorus compound and silicon compound and to the process for producing the same. More in detail, the present invention relates to acicular ferromagnetic alloy particles, containing Si, Cr, Ni and P impregnated with phosphorus compound and silicon compound and also acicular ferromagnetic alloy particles for magnetic recording, containing Si, Cr, Ni, P and Mg impregnated with phosphorus compound and silicon compound, and to a process for producing acicular ferromagnetic alloy particles containing Si, Cr, Ni and P impregnated with phosphorus compound and silicon compound, comprising the steps of, oxidizing $Fe(OH)_2$ in an aqueous suspension by blowing an oxygen-containing gas into said aqueous suspension of $Fe(OH)_2$ of pH of higher than 11 obtained by reacting an aqueous solution of a ferrous salt with an aqueous solution of an alkali metal hydroxide thereby obtaining acicular particles of alpha-FeOOH containing Si, Cr and Ni, a water-soluble salt of silicic acid being added into said aqueous solution of an alkali metal hydroxide or into said aqueous suspension of $Fe(OH)_2$ before blowing said oxygen-containing gas in an amount of 0.1 to 1.7 atomic % (calculated as Si) to Fe of said ferrous salt, and a water-soluble chromium salt and a water-soluble nickel salt being added into said aqueous solution of the ferrous salt, said aqueous solution of the alkali metal hydroxide, said aqueous suspension of $Fe(OH)_2$ before blowing the oxygen-containing gas thereinto, or said aqueous suspension of $Fe(OH)_2$ during oxidizing by blowing the oxygen-containing gas thereinto, in the respective amount of 0.1 to 5.0 atomic % (calculated as Cr) and 0 1 to 7.0 atomic % (calculated as Ni) to Fe of said ferrous salt, after collecting said acicular particles of alpha-FeOOH containing Si, Cr and Ni from the mother liquor and suspending the thus obtained particle in water, adding 0.1 to 2% by weight of a salt of phosphoric acid (calculated as $PO_3$) to said acicular particles of alpha-FeOOH containing Si, Cr and Ni in the thus formed aqueous suspension of pH of higher than 8, further adding 0.1 to 7.0% by weight of a water-soluble silicate (calculated as $SiO_2$) thereinto and adjusting the pH of the thus prepared aqueous suspension to 3 to 7, thereby obtaining the acicular particles of alpha-FeOOH containing Si, Cr and Ni coated with a phosphorus compound and a silicon compound, after collecting said acicular particles by filtering and drying said acicular particles, subjecting the thus dried acicular particles of alpha-FeOOH containing Si, Cr and Ni coated with said phosphorus compound and said silicon compound to thermal treatment in a non-reducing atmosphere, thereby obtaining the acicular particles of alpha-$Fe_2O_3$ containing Si, Cr and Ni impregnated with said phosphorus compound and said silicon compound, subjecting the thus obtained acicular particles of alpha-$Fe_2O_3$ containing Si, Cr and Ni impregnated with said phosphorus compound and said silicon compound to thermal reduction in a reducing gas thereby obtaining acicular ferromagnetic alloy particles containing Si, Cr, Ni and P impregnated with phosphorus compound and silicon compound, and a process for producing acicular ferromagnetic alloy particles containing Si, Cr, Ni, Mg and P impregnated with phosphorus compound and silicon compound, comprising the steps of, oxidizing $Fe(OH)_2$ in an aqueous suspension by blowing an oxygen-containing gas into said aqueous suspension of $Fe(OH)_2$ of pH of higher than 11 obtained by reacting an aqueous solution of a ferrous salt with an aqueous solution of an alkali metal hydroxide thereby obtaining acicular particles of alpha-FeOOH containing Si, Cr, Ni and Mg, a water-soluble silicate being added into said aqueous solution of an alkali metal hydroxide or into said aqueous suspension of $Fe(OH)_2$ before blowing said oxygen-containing gas in an amount of 0.1 to 1.7 atomic % (calculated as Si) to Fe of said ferrous salt a water-soluble chromium salt and a water-soluble nickel salt being added into said aqueous solution of the ferrous salt, said aqueous solution of the alkali metal hydroxide, said aqueous suspension of $Fe(OH)_2$ before blowing the oxygen-containing gas thereinto, or said aqueous suspension of $Fe(OH)_2$ during oxidizing by blowing the oxygen-containing gas thereinto, in the respective amount of 0.1 to 5.0 atomic % (calculated as Cr) and 0.1 to 7.0 atomic % (calculated as Ni) into Fe of said ferrous salt, and a water-soluble magnesium salt being added to said aqueous solution of said ferrous salt, said aqueous solution of said alkali metal hydroxide, said aqueous suspension of $Fe(OH)_2$ before blowing said oxygen containing gas therein, or said aqueous suspension of $Fe(OH)_2$ during blowing said oxygen-containing gas thereinto in an amount of 0.1 to 15.0 atomic % as Mg to Fe corresponding to said ferrous salt in said aqueous suspension of $Fe(OH)_2$, thereby oxidizing said ferrous salt into acicular particles of alpha-FeOOH containing Si, Cr, Ni and Mg, after collecting said acicular particles of alpha-FeOOH containing Si, Cr, Ni and Mg from the mother liquor and suspending the thus obtained particle in water, adding 0.1 to 2% by weight of a salt of phosphoric acid (calculated as $PO_3$) to said acicular particles of alpha-FeOOH containing Si, Cr, Ni and Mg in the thus formed aqueous suspension of pH of higher than 8, further adding 0.1 to 7.0% by weight of a water-soluble silicate (calculated as $SiO_2$) thereinto, and adjusting the pH of the thus prepared aqueous suspension to 3 to 7, thereby obtaining the acicular particles of alpha-FeOOH containing Si, Cr, Ni and Mg coated with a phosphorus compound and a silicon compound, after collecting said acicular particles by filtering and drying said acicular particles, subjecting the thus dried acicular particles of alpha-FeOOH containing Si, Cr, Ni and Mg coated with said phosphorus compound and said silicon compound to thermal treatment in a non-reducing atmosphere thereby obtaining the acicular particles of alpha-$Fe_2O_3$ containing Si, Cr, Ni and Mg impregnated with said phosphorus compound and said silicon compound, subjecting the thus obtained acicular particles of alpha-$Fe_2O_3$ containing Si, Cr, Ni and Mg impregnated with said phosphorus compound and said silicon compound to thermal reduction in a reducing gas thereby obtaining acicular ferromagnetic alloy particles containing Si, Cr, Ni, Mg and P impregnated with phosphorus compound and silicon compound.

The acicular ferromagnetic alloy particles containing Si, Cr, Ni and P and optionally containing Mg impregnated with phosphorus compound and silicon compound of the present invention is most suitable as a magnetic material for magnetic recording in audio and video, particularly as a magnetic material for video, not being contaminated by any dendrites and not having any entwining particles each other, thus resulting in large in apparent density, large in specific surface area as minute particles, high in crystallinity of the surface and of the inner part of particles, substantially high in density, high in coercive force and large in saturation magnetization thereof.

In recent years, the longer-time recording, the miniaturization and the weight-saving of the reproducing apparatus for magnetic recording for audio and video have been remarkably intensified, particularly with the striking popularization of VTR in these days. Accordingly, the development of VTR has been vigorously carried out with the objects of the longer-time recording, the miniaturization and the weight-saving thereof. On the other hand, the demand for the magnetic tape, i.e., the magnetic recording media, with higher performance and higher recording density has been intensified.

Namely, the high quality of the picture, the high output capacity, particularly the improvement of frequency characteristics and the reduction of noise level are required to the magnetic recording media. For matching these requirements, it is necessary to improve the residual magnetic flux density(Br), the coercive force(Hc), dispersibility, the packing property, the smoothness of the surface of the tape and the signal to noise ratio S/N.

These specific properties of magnetic recording media are in a close relationship with the magnetic material for use in the magnetic recording media, for instance, as are seen in the following description on pages 83 to 84 of an article entitled with "The Recent Progress of Magnetic Tapes for Video and Audio", pages 82 to 105 published by NIKKEI-Electronics (1976) on May 3, 1976.

"The major specific properties which represent the quality of the picture of the video-tape recorder are (1) the video signal to noise ratio S/N, (2) chroma noise and (3) the frequency characteristics of video signal . . . , these specific properties representing the picture are decided by the electro-magnetic tranforming characteristics and the electro-magnetic transforming characteristics is interrelated to the magnetic properties of the tape. Furthermore, a larger part of the magnetic properties of the tape is decided by the magnetic material constructing the tape."

As is described above, the various specificities of the quality of the picture reproduced from magnetic recording media are in close relationship with the magnetic material used for preparing the media, and accordingly, the improvement of the characteristics of the magnetic material is strongly demanded.

The relationship between the various characteristics of the magnetic recording media and the characteristics of the magnetic materials used for preparing the media are described in detail as follows.

In order to obtain a high quality in the picture reproduced from magnetic recording media used in video, as are clearly seen in the afore-mentioned description in "NIKKEI-Electronics", the improvement of (1) video signal to noise ratio S/N, (2) chroma noise and (3) video frequency characteristics.

In order to improve the video signal to noise ratio S/N, it is important to micronize the magnetic particles and to improve the dispersibility thereof in the vehicle, the orientation and packing thereof in the coating medium and the smoothness of the surface of the magnetic recording medium. These facts are clearly recognizable also from the following description in the afore-cited "NIKKEI-Electronics" on page 85.

"As the physical properties of the tape, which are in connection with the signal to noise ratio S/N(CN ratio) of the luminance signal, the average number of the particles per unit volume the state of dispersion thereof(dispersibility thereof) and the smoothness of the surface of the tape are mentioned. In the case where the smoothness of the surface and the dispersibility of the particle are constant, the signal to noise ratio S/N becomes better in proportion to the square root of the average number of the perticle per unit volume and accordingly, the magnetic particle is the more favorable as the volume thereof is the smaller and the degree of packing thereof is the larger. In addition, as a method for improving the video signal of noise ratio S/N, it is an important method to reduce the noise level attributable to the magnetic recording media, and for reducing the noise level, it has been known that the micronization of the particle size of the acicular ferromagnetic alloy particles which are the magnetic material for use in preparing the medium for magnetic recording, as are seen in the afore-cited description."

As a general means for indicating the size of the magnetic particle, the value of the specific surface area of the particle is frequently used, and it has also been generally known that the noise level attributable to the magnetic recording media becomes smaller as the specific surface area becomes larger. This phenomenon is shown, for instance, in the Technical Research Report of DENSHI TSUSHIN GAKKAI(The Inst. of Electronics and Communication Engineers of Japan), MR 81-11, page 27, 23-9, FIG. 3. FIG. 3 is a figure showing the relationship between the specific surface area of the acicular particles of Co-coated maghemite and the noise level, and as is seen in FIG. 3, the noise level is linearly reduced as the specific surface area of the particle becomes larger. This relationship is also realizable in the acicular ferromagnetic particles and in the acicular ferromagnetic alloy particles.

In order to improve the dispersibility of the magnetic particles in the behicle and the packing thereof in the coating medium, it is required that the magnetic particles to be dispersed in the vehicle have good acicularity, and are uniform in their size, not contaminated by the dendrites and not interwound each other, and as a result, that they have large apparent density.

In order to improve the chroma noise, it is important to improve the surface characteristics of the magnetic recording media, and for that purpose in turn, the magnetic particles are preferably excellent in the dispersibility and the orientability thereof, and in conclusion, it is required that the magnetic particles have good acicularity, and are uniform in their size, not contaminated by dendrites and not interwound each other, and as a result, that they have large apparent density.

These facts are clearly understood from the following description in the afore-mentioned NIKKEI-Electronics on page 85.

"The chroma noise is caused by the roughness with a relatively longer period on the surface of the magnetic tape, and accordingly, it has a close relationship with the technique of coating, and the particles of the better dispersibility and the better orientability are able to give the better surface characteristics to the magnetic tape."

Furthermore, in order to improve the radio frequency output for video signal of the magnetic tape, it is necessary that the coercive force and the residual magnetic flux density (Br) are large enough. For the improvement of the coercive force(Hc) of the magnetic recording media, it is required that the coercive force(Hc) of the magnetic particles themselves is as high as possible.

In order to have a large residual magnetic flux density (Br), the saturation magnetization ($\sigma$s) of the magnetic particles should be as large as possible, and Br depends on the dispersibility of the magnetic particles in the behicle and the orientation of the magnetic particles in the coating medium. These facts are clearly recognized from the following descriptions in pages 84 to 85 of the afore-mentioned NIKKEI-Electronics.

"The maximum output of the magnetic tape is decided by the residual magnetic flux density (Br), the coercive force(Hc) and the effective spacing of the magnetic tape. With the increase of Br, the number of magnetic flux entering into the reproducing head increase resulting in the increased output. . . . With the increase of Hc, the self-demagnetization is reduced resulting in the increased output. . . . The first fundamental prerequisite to have a large Br of the magnetic tape is that the saturation magnetization, Is($\sigma$s), possessed by the magnetic particle in a complete state, for instance, in a single crystalline state, is large enough. . .
. Br shows changes even in the same material according to the degree of packing thereof and since Br is proportional to the squareness ratio (residual magnetic flux density/saturation magnetic flux density), it is required that the squareness ratio is large enough to have a large Br. . . . It is advantageous for making the squareness ratio larger to use the magnetic particles which are uniform in particle size, high in aspect ratio and excellent in the orientability into the direction of magnetic field. . . ."

As is described in detail as above, in order to fulfill the requirements for the improvement of the quality of the picture, the output, particularly the frequency characteristics and the noise level of the magnetic recording media, that is, the requirement for the highly improved performance of the magnetic recording media, it is necessary to use the magnetic particles provided with the following characteristics, (1) high acicularity, (2) uniform in particle size (3) without being contaminated by dendrites, (4) without having interwound particles, (5) substantially large in apparent density as a result of having a large specific surface area and a highly raised degree of crystallite within the particles and (6) having a high coercive force Hc, and a large saturation magnetization.

In this connection, the magnetic materials which have hitherto been used for preparing the magnetic recording media are the magnetic particles of, for instance, magnetite, maghemite and chromium dioxide having the saturation magnetization, $\sigma$s, of 70 to 85 emu/g and the coercive force of 250 to 500 Oe.

Particularly, the fact that saturation magnetization of these magnetic particles is 85 emu/g at the highest in the case where the magnetic particles are oxide and is 70 to 80 emu/g in general is the major cause which limits the reproduced output and the recording density of the magnetic tape.

Furthermore, the magnetic particles containing Co., such as Co-magnetite and Co-maghemite are also used for the same purpose, and although these magnetic particles have a characteristically high coercive force of 400 to 800 Oe, their saturation magnetization is as low as 60 to 80 emu/g.

In recent years, the development of the magnetic particles provided with the characteristics suitable for high output and high recording density, that is, the magnetic particles large in saturation magnetization and high in coercive force has been vigorously carried out, and the thus developed magnetic particles provided with such characteristics are those obtained thermally reducing generally the acicular particles of iron hydroxide, the acicular particles of iron oxide or the acicular particles of iron hydroxide or iron oxide containing metal(s) other than iron in a reducing gas at about 350° C, which are the acicular ferromagnetic particles or acicular ferromagnetic alloy particles.

These magnetic particles characteristically show a remarkably larger saturation magnetization ($\sigma$s) and a higher coercive force(Hc) as compared to the hitherto used magnetic particles of iron and the magnetic particles of Co-containing iron oxide, and in the case where they are coated as the magnetic recording media, because of the large residual magnetic flux density(Br) and the high coercive force(Hc) thereof, the thus prepared magnetic tape is suitable for magnetic recording of high density and exhibits a high output and accordingly, such magnetic particles have attracted attention and they have been put to practical use in recent years.

In order that the acicular ferromagnetic particles or acicular ferromagnetic alloy particles exhibit the high coercive force(Hc) and the large saturation magnetization ($\sigma$s), it is necessary that (1) they are substantially acicular crystalline in shape, (2) they are uniform in particle size thereof, (3) they are not contaminated by dendrites and (4) they are not interwound with each other, as has been stated, and for producing such magnetic particles provided with the above-mentioned characteristics, and it is necessary that the flocks of Fe(OH)$_2$ which are the precursor of the acicular particles of alpha-FeOOH which are the starting material of the acicular ferromagnetic particles or the acicular ferromagnetic alloy particles are uniform in size and structure and in the same time that the particles of Fe(OH)$_2$ themselves which constitutes the flock are uniform in size and in addition, that the acicular particles of alpha-FeOOH are uniform in particle size and are not contaminated by dendrites.

Such flocks of Fe(OH)$_2$ and acicular particles of alpha-FeOOH are obtained by the respective steps formerly invented and patented by the present inventor(refer to Japanese Patent Publication No. 55-8461 (1980) and Japanese Patent Publication No. 55-32652 (1980)). According to the publications, in the preparation of the acicular particles of alpha-FeOOH by blowing an oxygen-containing gas into an aqueous suspension of Fe-(OH)$_2$ of pH of higher than 11 at a temperature of lower than 80° C, which is prepared by admixing an aqueous solution of a ferrous salt with an aqueous solution of an alkali metal hydroxide in amount of more than equivalent to Fe, a water-soluble silicate such as sodium- or potassium silicate is preliminarily added to the aqueous solution of an alkali hydroxide, or to the aqueous suspension of Fe(OH)$_2$ before blowing the oxygen-containing gas thereinto in an amount of 0.1 to 1.7 atomic %(calculated as Si) to Fe in the reaction system.

The thus obtained acicular particles of alpha-FeOOH contain about all amounts of the thus added water-soluble silicate, and the content of Si in the particles is 0.201 to 1.06 atomic % calculated as Si to Fe of the ferrous salt used.

Although the acicular ferromagnetic alloy particles (Si in Fe) obtained by subjecting the thus prepared acicular particles of alpha-FeOOH containing Si to thermal reduction are also uniform in particle size and not contaminated by dendrites and characteristically show a large apparent density, a favorable dispersibility when they are processed into paints, a high packing property in the coating medium prepared thereof and a large residual magnetic flux density(Br), they are small in the specific surface area of 20 m$^2$/g at best.

As a result of the present inventor's studies for improving the specific surface area of the thus obtained magnetic particles containing Si, it has been found by the present inventor that in the case of preparing the acicular particles of alpha-FeOOH containing Si and being uniform in particle size without being contaminated by dendrites, the addition of a water-soluble chromium salt into the aqueous solution of a ferrous salt, the aqueous solution of an alkali metal oxide, the aqueous suspension of Fe(OH)$_2$ before blowing an oxygen-containing gas or the aqueous suspension of Fe(OH)$_2$ during oxidation by blowing an oxygen-containing gas thereinto in an amount of 0.1 to 5.0 atomic % calculated as Cr to Fe in the reaction system improves the specific surface area of the acicular ferromagnetic alloy particles containing Cr other than Si obtained by subjecting the thus prepared acicular particles of alpha-FeOOH containing Cr other than Si to thermal reduction.

Further, in the present inventors' studies for improving the coercive force of the acicular ferromagnetic alloy particles, it has been found by the present inventors that in the case of forming the acicular particles of alpha-FeOOH containing Si and Cr, the addition of a water-soluble nickel salt into the aqueous solution of a ferrous salt, the aqueous solution of an alkali metal hydroxide, the aqueous suspension of Fe(OH)$_2$ before blowing an oxygen-containing gas thereinto or the aqueous suspension of Fe(OH)$_2$ during oxidation thereof by blowing the oxygen-containing gas thereinto gives the acicular ferromagnetic alloy particles con taining Ni other than Si and Cr showing a larger coercive force than that of the acicular ferromagnetic alloy particles only containing Si and Cr while retaining the specific surface area as large as that of the acicular ferromagnetic particles only containing Si and Cr.

Furthermore, in the present inventors' studies for further improving the specific surface area and the coercive force of the acicular ferromagnetic alloy particles containing Si, Cr and Ni it has been found that (1) in the case where the amount of addition of the water-soluble chromium salt is over 5.0 atomic %, both the coercive force and the saturation magnetization of the magnetic particles show a tendency of decreasing although the specific surface area is improved, (2) in the case where the amount of addition of the water-soluble nickel salt is over 7.0 atomic %, some foreign matters other than the acicular crystalline are found in the acicular particles of alpha-FeOOH and (3) in the case where in the preparation of the acicular particles of alpha-FeOOH containing Si, Cr and Ni, a water-soluble magnesium is further added preliminarily into the aqueous solution of a ferrous salt, the aqueous solution of an alkali metal hydroxide or the aqueous suspension of Fe(OH)$_2$ before blowing the oxygen-containing gas thereinto or the aqueous suspension of Fe(OH)$_2$ during the blowing of the oxygen-containing gas thereinto for carrying out oxidation in an amount of 0.1 to 15.0 atomic % calculated as Mg to Fe in the reaction system and the thus obtained acicular particles of alpha-FeOOH is thermally reduced, both the specific surface area and the coercive force of the thus obtained acicular ferromagnetic alloy particles containing Si, Cr, Ni and Mg are superior to those of the acicular ferromagnetic alloy particles containing Si, Cr and Ni.

SUMMARY OF THE INVENTION

In a first aspect of the present invention, there is provided acicular ferromagnetic alloy particles for magnetic recording, containing Si, Cr, Ni and P impregnated with phosphorus compound and silicon compound.

In a second aspect of the present invention, there is provided acicular ferromagnetic alloy particles for magnetic recording, containing Si, Cr, Ni, Mg and P impregnated with phosphorus compound and silicon compound.

In a third aspect of the present invention, there is provided a process for producing acicular ferromagnetic alloy particles containing Si, Cr, Ni and P impregnated with phosphorus compound and silicon compound comprising the steps of, oxidizing Fe(OH)$_2$ in an aqueous suspension by blowing an oxygen-containing gas into said aqueous suspension of Fe(OH)$_2$ of pH of higher than 11 obtained by reacting an aqueous solution of a ferrous salt with an aqueous solution of an alkali metal hydroxide thereby obtaining acicular particles of alpha-FeOOH containing Si, Cr and Ni, a water-soluble silicate being added into said aqueous solution of an alkali metal hydroxide or into said aqueous suspension of Fe(OH)$_2$ before blowing said oxygen-containing gas in an amount of 0.1 to 1.7 atomic % (calculated as Si) to Fe of said ferrous salt and a water-soluble chromium salt and a water-soluble nickel salt being added into said aqueous solution of the ferrous salt, said aqueous solution of the alkali metal hydroxide, said aqueous suspension of Fe(OH)$_2$ before blowing the oxygen-containing gas thereinto, or said aqueous suspension of Fe(OH)$_2$ during oxidizing by blowing the oxygen-containing gas thereinto, in the respective amount of 0.1 to 5.0 atomic % (calculated as Cr) and 0.1 to 7.0 atomic % (calculated as Ni) to Fe of said ferrous salt, after collecting said acicular particles of alpha-FeOOH containing Si, Cr and Ni from the mother liquor and suspending the thus obtained particle in water, adding 0.1 to 2% by weight of a salt of phosphoric acid (calculated as PO$_3$) to said acicular particles of alpha-FeOOH containing Si, Cr and Ni in the thus formed aqueous suspension of pH of higher than 8, further adding 0.1 to 7.0% by weight of a water-soluble silicate (calculated as SiO$_2$) thereinto, and adjusting the pH of the thus prepared aqueous suspension to 3 to 7, thereby obtaining the acicular particles of alpha-FeOOH containing Si, Cr and Ni coated with a phosphorus compound and a silicon compound, after collecting said acicular particles by filtering and drying said acicular particles, subjecting the thus dried acicular particles of alpha-FeOOH containing Si, Cr and Ni coated with said phosphorus compound and said silicon compound to thermal treatment in a non-reducing atmosphere, thereby obtaining the acicular particles of alpha-$Fe_2O_3$ containing Si, Cr and Ni impregnated with said phosphorus compound and said silicon compound, subjecting the thus obtained acicular particles of alpha-$Fe_2O_3$ containing Si, Cr and Ni impregnated with said phosphorus compound and said silicon compound to thermal reduction in a reducing gas thereby obtaining acicular ferromagnetic alloy particles containing Si, Cr, Ni and P impregnated with phosphorus compound and silicon compound.

In a fourth aspect of the present invention, there is provided a process for producing acicular ferromagnetic alloy particles containing Si, Cr, Ni, Mg and P impregnated with phosphorus compound and silicon compound, comprising the steps of, oxidizing $Fe(OH)_2$ in an aqueous suspension by blowing an oxygen-containing gas into said aqueous suspension of $Fe(OH)_2$ of pH of higher than 11 obtained by reacting an aqueous solution of a ferrous salt with an aqueous solution of an alkali metal hydroxide thereby obtaining acicular particles of alpha-FeOOH containing Si, Cr and Ni, a water-soluble silicate being added into said aqueous solution of an alkali metal hydroxide or into said aqueous suspension of $Fe(OH)_2$ before blowing said oxygen-containing gas in an amount of 0.1 to 1.7 atomic % (calculated as Si) to Fe of said ferrous salt, a water-soluble chromium salt and a water-soluble nickel salt being added into said aqueous solution of the ferrous salt, said aqueous solution of the alkali metal hydroxide, said aqueous suspension of $Fe(OH)_2$ before blowing the oxygen-containing gas thereinto, or said aqueous suspension of $Fe(OH)_2$ during oxidizing by blowing the oxygen-containing gas thereinto, in the respective amount of 0.1 to 5.0 atomic % (calculated as Cr) and 0.1 to 7.0 atomic % (calculated as Ni) to Fe of said ferrous salt, and a water-soluble magnesium salt being added to said aqueous solution of said ferrous salt, said aqueous solution of said alkali metal hydroxide, said aqueous suspension of $Fe(OH)_2$ before blowing said oxygen-containing gas therein, or said aqueous suspension of $Fe(OH)_2$ during blowing said oxygen-containing gas thereinto in an amount of 0.1 to 15.0 atomic % as Mg to Fe corresponding to said ferrous salt in said aqueous suspension of $Fe(OH)_2$, thereby oxidizing said ferrous salt into acicular particles of alpha-FeOOH containing Si, Cr, Ni and Mg, after collecting said acicular particles of alpha-FeOOH containing Si, Cr, Ni and Mg from the mother liquor and suspending the thus obtained particle in water, adding 0.1 to 2% by weight of a salt of phosphoric acid (calculated as $PO_3$) to said acicular particles of alpha-FeOOH containing Si, Cr, Ni and Mg in the thus formed aqueous suspension of pH of higher than 8, further adding 0.1 to 7.0% by weight of a water-soluble silicate (calculated as $SiO_2$) thereinto, and adjusting the pH of the thus prepared aqueous suspension to 3 to 7, thereby obtaining the acicular particles of alpha-FeOOH containing Si, Cr, Ni and Mg coated with a phosphorus compound and a silicon compound, after collecting said acicular particles by filtering and drying said acicular particles, subjecting the thus dried acicular particles of alpha-FeOOH containing Si, Cr, Ni and Mg coated with said phosphorus compound and said silicon compound to thermal treatment in a non-reducing atmosphere, thereby obtaining the acicular particles of alpha-$Fe_2O_3$ containing Si, Cr, Ni and Mg impregnated with said phosphorus compound and said silicon compound, subjecting the thus obtained acicular particles of alpha-$Fe_2O_3$ containing Si, Cr, Ni and Mg impregnated with said phosphorus compound and said silicon compound to thermal reduction in a reducing gas thereby obtaining acicular ferromagnetic alloy particles containing Si, Cr, Ni, Mg and P impregnated with phosphorus compound and silicon compound.

BRIEF EXPLANATION OF DRAWINGS

FIG. 5 shows the acicular particles of alpha-FeOOH containing Si, Cr and Ni obtained in Example 1, FIG. 6 shows the acicular particles of alpha-FeOOH obtained in Comparative Example 1, FIG. 7 shows the acicular ferromagnetic alloy particles containing Si, Cr, Ni and P impregnated with phosphorus compound and silicon compound obtained in Example 43, FIG. 8 shows the ferromagnetic particles obtained in comparative Example 2, FIG. 9 shows the acicular particles of alpha-FeOOH containing Si, Cr, Ni and Mg obtained in Example 71 and FIG. 10 shows the acicular ferromagnetic alloy particles containing Si, Cr, Ni, Mg and P impregnated with phosphorus compound and silicon compound obtained in Example 116.

DETAILED EXPLANATION OF THE INVENTION

Figure 1:
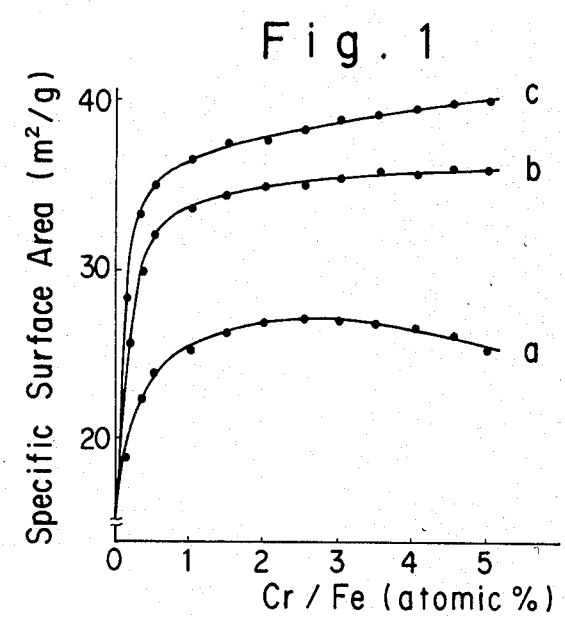
FIG. 1 shows the relationship between the amount of a water-soluble chromium salt added and the specific surface area of the acicular ferromagnetic alloy particles containing both Si and Cr or that of the acicular ferromagnetic alloy particles containing only Cr.

The present invention relates to acicular ferromagnetic alloy particles containing Si, Cr, Ni and P and optionally Mg impregnated with phosphorus compound and silicon compound, which are substantially acicular crystalline in structure, minute and uniform in particle size, not contaminated by dendrites, and as the results, are large in apparent density and specific surface area, substantially high in density as a result of raised crystallinity in the surface and interior of the particles thereof, and provided with a high coercive force(Hc) and a large saturation magnetization($\sigma$s), thus being suitable as a magnetic material for magnetic recording of audio, video, etc., particularly most suitable as the magnetic material for use in video, and the process for producing thereof.

The process for producing the acicular ferromagnetic alloy particles containing Si, Cr, Ni and P and optionally Mg is explained as follows:

A process for producing acicular ferromagnetic alloy particles for magnetic recording, containing Si, Cr, Ni and P and optionally containing Mg impregnated with phosphorus compound and silicon compound, comprises the steps of, oxidizing $Fe(OH)_2$ in an aqueous suspension by blowing an oxygen-containing gas into said aqueous suspension of $Fe(OH)_2$ of pH of higher than 11 obtained by reacting an aqueous solution of a ferrous salt with an aqueous solution of an alkali metal hydroxide thereby obtaining acicular particles of alpha-FeOOH containing Si, Cr and Ni, a water-soluble silicate being added into said aqueous solution of an alkali metal hydroxide or into said aqueous suspension of $Fe(OH)_2$ before blowing said oxygen-containing gas in an amount of 0.1 to 1.7 atomic % (calculated as Si) to Fe of said ferrous salt, a water-soluble chromium salt and a water-soluble nickel salt being added into said aqueous solution of the ferrous salt, said aqueous solution of the alkali metal hydroxide, said aqueous suspension of $Fe(OH)_2$ before blowing the oxygen-containing gas thereinto, or said aqueous suspension of $Fe(OH)_2$ during oxidizing by blowing the oxygen-containing gas thereinto, in the respective amount of 0.1 to 5.0 atomic % (calcuated as Cr) and 0.1 to 7.0 atomic % (calculated as Ni) to Fe of said ferrous salt, and a water-soluble magnesium salt being optionally added to said aqueous solution of said ferrous salt, said aqueous solution of said alkali metal hydroxide, said aqueous suspension of $Fe(OH)_2$ before blowing said oxygen-containing gas therein, or said aqueous suspension of $Fe(OH)_2$ during blowing said oxygen-containing gas thereinto in an amount of 0.1 to 15.0 atomic % as Mg to Fe corresponding to said ferrous salt in said aqueous suspension of $Fe(OH)_2$, thereby oxidizing said ferrous salt into acicular particles of alpha-FeOOH containing Si, Cr and Ni and optionally containing Mg, after colleting said acicular particles of alpha-FeOOH containing Si, Cr and Ni and optionally containing Mg from the mother liquor and suspending the thus obtained particle in water, adding 0.1 to 2% by weight of a salt of phosphoric acid (calculated as $PO_3$) to said acicular particles of alpha-FeOOH containing Si, Cr and Ni and optionally containing Mg in the thus formed aqueous suspension of pH of higher than 8, further adding 0.1 to 7.0% by weight of a water-soluble silicate (calculated as $SiO_2$) thereinto, and adjusting the pH of the thus prepared aqueous suspension to 3 to 7, thereby obtaining the acicular particles of alpha-FeOOH containing Si, Cr and Ni and optionally containing Mg coated with a phosphorus compound and a silicon compound, after collecting said acicular particles by filtering and drying said acicular particles, subjecting the thus dried acicular particles of alpha-FeOOH containing Si, Cr and Ni and optionally containing Mg coated with said phosphorus compound and said silicon compound to thermal treatment in a non-reducing atmosphere, thereby obtaining the acicular particles of alpha-$Fe_2O_3$ containing Si, Cr and Ni and optionally containing Mg impregnated with said phosphorus compound and said silicon compound, subjecting the thus obtained acicular particles of alpha-$Fe_2O_3$ containing Si, Cr and Ni and optionally containing Mg impregnated with said phosphorus compound and said silicon compound to thermal reduction in a reducing gas thereby obtaining acicular ferromagnetic alloy particles containing Si, Cr, Ni and P and optionally containing Mg impregnated with phosphorus compound and silicon compound.

FIG. 1 shows the relationship between the amount of a water-soluble chromium salt added and the specific surface area of the acicular ferromagnetic alloy particles containing both Si and Cr or that of the acicular ferromagnetic alloy particles containing only Cr.

The experiments were carried out as follows.

Into 400 liters of aqueous solution of sodium hydroxide, to which sodium silicate and chromium sulfate had been preliminarily added respectively in the respective amounts of 0 to 1.0 atomic % (calculated as Si) and 0 to 5.0 atomic % (calculated as Cr) to Fe, introduced into a reaction vessel, 300 liters of aqueous solution of ferrous sulfate, containing 1.2 mol of $Fe^{2+}$/liter were added to obtain an aqueous suspension of $Fe(OH)_2$ of pH of 13.8, and by subjecting the thus obtained aqueous suspension to oxidation while blowing air at a rate of 1000 liters/min thereinto at a temperature of 45° C., the particles of acicular crystalline alpha-FeOOH were obtained. Then, by subjecting the thus obtained particles to thermal reduction for 4 hours at 430° C., the acicular ferromagnetic alloy particles containing both Si and Cr and those containing Cr only were obtained. In FIG. 1, the Curves a, b and c respectively indicate the relationship between the ratio of chromium to iron and the specific surface area of the particles not containing Si, that of the particles containing 0.35 atomic % of Si and that of the particles containing 1.0 atomic % of Si.

As are seen in Curves b and c, in the case where Si and Cr are used together, the specific surface area of the acicular ferromagnetic alloy particles containing Si and Cr together is remarkably improved and there is a tendency of the increase of the specific surface area with the increase of the amount of chromium sulfate, and since the tendency appears far more remarkably than the tendency of the case where Cr was singly added as is seen in Curve a, it is considered by the present inventor that the effect is due to the synergism of Si and Cr.

Although the thus obtained acicular ferromagnetic alloy particles containing Si and Cr are uniform in particle size, not being contaminated by dendrites and large in specific surface area, on the other hand, there is observed a tendency of the decrease of the coercive force of the magnetic particles with the increase of the amount of Cr added.

Figure 2:
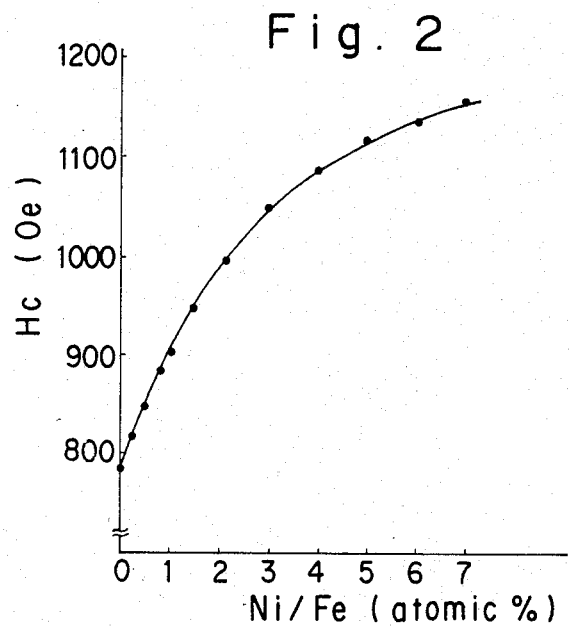
FIG. 2 shows the relationship between the amount of a water-soluble nickel salt and the coercive force of the acicular ferromagnetic alloy particles containing Si, Cr and Ni.

FIG. 2 shows the relationship between the amount of a water-soluble nickel salt and the coercive force of the acicular ferromagnetic alloy particles containing Si, Cr and Ni obtained in the following experiments.

The experiments were carried out as follows.

Into 400 liters of aqueous solution of sodium hydroxide to which sodium silicate, chromium sulfate and nickel sulfate had been preliminarily added in the respective amounts of 0.35 atomic % calculated as Si, 0.5 atomic % calculated as Cr and 0 to 7.0 atomic % calculated as Ni and which had been introduced into a reaction vessel, 300 liters of aqueous solution of ferrous sulfate containing 1.2 mol of $Fe^{2+}$/liter were added, thereby obtaining an aqueous suspension of $Fe(OH)_2$ at a pH of 14.0, and air was blown into the thus obtained aqueous suspension at a rate of 1000 liters/min at a temperature of 45° C. of the aqueous suspension to carry out oxidation of $Fe(OH)_2$, thereby forming the acicular particles of alpha-FeOOH containing Si, Cr and Ni. By thermally reducing the thus obtained particles at 420° C. for 4 hours, the acicular ferromagnetic alloy particles containing Si, Cr and Ni.

As is seen in FIG. 2, there is obtained a tendency of the increase of the coercive force of the thus obtained acicular ferromagnetic alloy particles containing Si, Cr and Ni with the increase of the amount of nickel sulfate added in the reaction system. The phenomenon of increasing the coercive force of the acicular ferromagnetic alloy particles containing Si, Cr and Ni while retaining the large specific surface area thereof is never seen in the case where any one of Si, Cr and Ni is not contained in the magnetic particles, and accordingly, the present inventor considers that the phenomenon is due to the synergism of Si, Cr and Ni.

Figure 3:
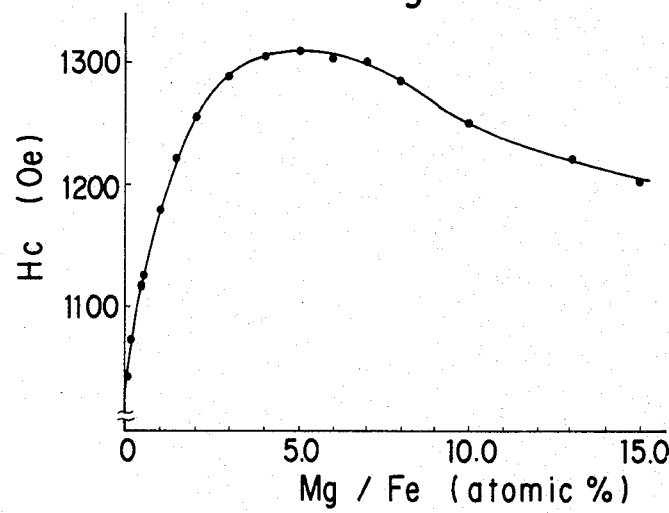
FIG. 3 shows the relationship between the amount of addition of the water-soluble magnesium salt and the coercive force of the acicular ferromagnetic alloy particles containing Si, Cr, Ni and Mg.
Figure 4:
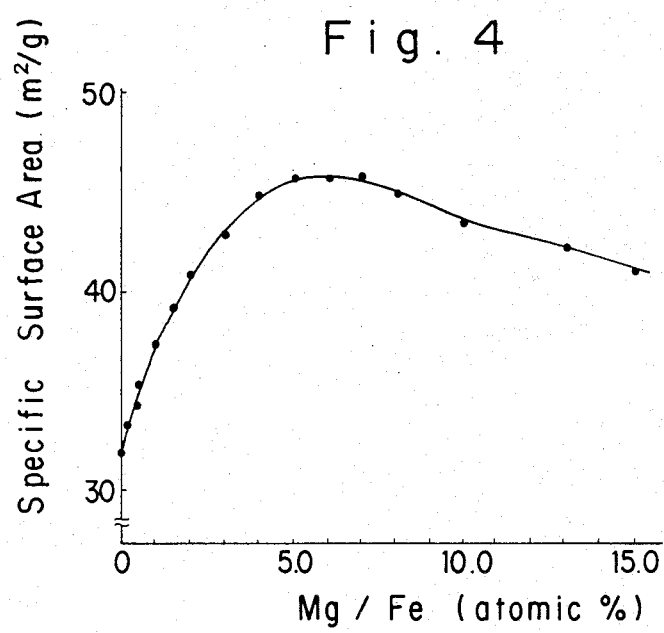
FIG. 4 shows the relationship between the amount of addition of the water-soluble magnesium salt and the specific surface area.

FIG. 3 shows the relationship between the amount of addition of the water-soluble magnesium salt and the coercive force of the acicular ferromagnetic alloy particles containing Si, Cr, Ni and Mg produced in the following experiments, and FIG. 4 shows the relationship between the amount of addition of the water-soluble magnesium salt and the specific surface area of those shown above.

The experiments were carried out as follows.

Into 400 liters of aqueous solution of sodium hydroxide to which sodium silicate, chromium sulfate, nickel sulfate and magnesium sulfate had been respectively added preliminarily in the respective amounts of 0.35 atomic % calculated as Si, 0.50 atomic % calculated as Cr, 3.0 atomic % calculated as Ni and 0 to 15.0 atomic % calculated as Mg, 300 liters of aqueous solution of ferrous sulfate containing 1.2 mol of $Fe^{2+}$/liter were added, thereby obtaining an aqueous suspension of $Fe(OH)_2$ of pH of 14.0, and by blowing air into the thus obtained aqueous suspension at 50° C., at a rate of 1000 liters per minute to carry out oxidation of $Fe(OH)_2$, the acicular particles of alpha-FeOOH containing Si, Cr, Ni and Mg were formed.

The thus formed particles were subjected to thermal reduction at 420° C. for 4.5 hours to obtain the acicular ferromagnetic alloy particles containing Si, Cr, Ni and Mg.

Since the phenomenon of the improvement of both the coercive force and the specific surface area could not be observed in the magnetic particles which lack any of Si, Cr, Ni and Mg, it is considered by the inventor that the phenomenon is due to the synergism of Si, Cr, Ni and Mg with Fe.

Accordingly, the conditions in the process for producing the acicular ferromagnetic alloy particles containing P, Si, Cr and Ni and optionally containing Mg impregnated with phosphorus compound and silicon compound of our invention are explained as follows:

As the water-soluble chromium salt for use according to the present invention, chromium sulfate and chromium chloride may be mentioned, and it is necessary to make the chromium salt exist at the time of formation of the acicular particles of alpha-FeOOH containing Si, Cr and Ni and optionally containing Mg. For that purpose, the chromium salt may be added into the aqueous solution of a ferrous salt, the aqueous solution of an alkali metal hydroxide, the aqueous suspension of $Fe(OH)_2$ before blowing the oxygen-containing gas or the aqueous suspension of $Fe(OH)_2$ in reaction by blowing the gas. It is noticeable that the addition of the chromium salt after completion of the formation of the acicular particles of alpha-FeOOH can not give the effect of adding thereof, because chromium does not enter into the completed particle.

Almost all chromium of the added chromium salt (0.1 to 5.0 atomic % calculated as Cr to Fe in the reaction system) is contained in the thus formed acicular particles of alpha-FeOOH, and as will be seen in Tables 2 and 8, the thus obtained acicular particles of alpha-FeOOH contains 0.296 to 2.98 atomic % of Cr, which is nearly the same as the added amount of Cr, to Fe in the particle.

In the case where the amount of addition of the water-soluble chromium salt is less than 0.1 atomic % calculated as Cr to Fe in the system, the effect of improving the specific surface area of the acicular ferromagnetic alloy particles can not be obtained, however, on the other hand, in the case where the amount is over 5.0 atomic % calculated as Cr, the coercive force and the saturation magnetization of the acicular ferromagnetic alloy particles (hereinafter referred to as "the final product") are reduced and not favorable although the effect of improving the specific surface area thereof is retained.

As the water-soluble nickel salt for use according to the present invention, nickel sulfate, nickel chloride and nickel acetate and the like may be mentioned, and the time point of adding the water-soluble nickel salt is substantially the same as that of the water-soluble chromium salt, namely it is added to the aqueous solution of a ferrous salt, the aqueous solution of an alkali metal hydroxide, the aqueous suspension of $Fe(OH)_2$ before blowing the oxygen-containing gas or the aqueous suspension of $Fe(OH)_2$ in reaction by blowing the oxygen-containing gas thereinto, in an amount of 0.1 to 7.0 atomic % calculated as Ni to Fe in the reaction system. The situation of inability of the addition of the water-soluble nickel salt in improving the quality of the final product after the completion of the acicular particles of alpha-FeOOH is quite the same as in the case of the water-soluble chromium salt. Almost all of nickel in the thus added water-soluble nickel salt is contained in the thus formed acicular particles of alpha-FeOOH, and as will be seen in Tables 2 and 8, the acicular particles of alpha-FeOOH contains nearly the same amount as that added, namely, 2.01 to 7.00 atomic % calculated as Ni to Fe in the particles. In the case where the added amount of the water-soluble nickel salt is below 0.1 atomic % calculated as Ni to Fe in the reaction system, the effect of improving the coercive force of the final product is not exhibited, and on the other hand, in the case where the added amount of nickel in over 7.0 atomic %, it is unfavorable because of the contamination of the final product by the foreign matters although the object of the present invention is attained.

As the water-soluble magnesium salt for use according to the present invention magnesium sulfate and magnesium chloride may be mentioned. The time point of addition of the water-soluble magnesium salt, and the target of the addition thereof are quite the same as in the case of the water-soluble chromium salt because of the same reason in the case thereof. Almost all of magnesium of the thus added water-soluble magnesium salt amounting to 0.1 to 15.0 atomic % calculated as Mg to Fe of the reaction system is contained in the acicular particles of alpha-FeOOH, and as will be seen in Table 8, the thus obtained acicular particles of alpha-FeOOH contains almost the same amount of Mg as that of the added amount, that is, 1.01 to 14.94 atomic % calculated as Mg to Fe in the system.

In the case where the amount of addition of the water-soluble magnesium salt is below 0.1 atomic % calculated as Mg to Fe, the effect of improving the specific surface area and the coercive force of the acicular ferromagnetic alloy particles, and on the other hand, in the case where the amount is over 15.0 atomic % calculated as Mg to Fe, the saturation magnetization of the final product is unfavorably reduced although the other objects of the present invention are achieved.

Concerning the step of thermal reduction of the acicular particles of alpha-FeOOH containing Si, Cr and Ni and optionally containing Mg, which are uniform in particle size and are not contaminated by dendrites, thereby obtaining the acicular ferromagnetic alloy particles, the saturation magnetization of the final product becomes larger with the raise of the temperature of reduction, however, the deformation and sintering of the acicular ferromagnetic alloy particles and the sintering between the particles become remarkable with the raise of the temperature of reduction resulting in the reduction of the coercive force of the final product. Particularly, the shape and form of the particles are highly susceptible to the temperature in heating, and in the case where the heating atmosphere is reductive, the growth of each particle becomes remarkable resulting in overgrowth beyond the size of the original particle of alpha-FeOOH and in the disappearance of the outline of the original particles. Namely, the particles are deformed and sintered together resulting in the reduction of the coercive force.

The cause of the deformation of the particle itself and the sintering between the particles during the thermal reduction of the acicular particles of alpha-FeOOH is considered as follows:

Generally, the acicular particles of alpha-$Fe_2O_3$ obtained by thermally dehydration of the acicular particles of alpha-FeOOH at a temperature of about 300° C. have succeeded the acicular crystalline form and retain thereof, however, on the other hand, there are many open holes on the surface and the interior parts of the particles and the degree of crystallinity as alpha-$Fe_2O_3$ is very low because of the insufficient growth of the particle.

Accordingly, in the case where such acicular particles of alpha-$Fe_2O_3$ are subjected to thermal reduction, uniform growth of the single particle hardly occurs because of the too rapid growth thereof due to the rapid physical change.

Consequently, in the region of a single particle, where the growth of the particle has rapidly occurred, sintering of the particle and sintering between such parts respectively formed on the independent particles have occurred, and as a result, the form and shape of the particles become very fragile. In addition, in such a thermal reduction step, owing to the rapid volume contraction from metal oxide to metal, the form and shape of the particles become the more fragile.

Accordingly, in order to prevent both the deformation of the form and shape of the particles and the sintering of each particle and between the particles it is necessary to devise how to have the sufficient and uniform growth of the acicular particles of alpha-$Fe_2O_3$ containing Si, Cr and Ni and optionally containing Mg, thereby obtain the acicular particles of alpha-$Fe_2O_3$ containing Si, Cr and Ni and optionally containing Mg provided with a raised crystallinity and density, which have succeeded the acicular crystalline form of the acicular particles of alpha-FeOOH and are retaining thereof.

As a means for obtaining such acicular particles of alpha-$Fe_2O_3$ provided with a raised crystallinity and density, a method of subjecting the acicular particles of alpha-FeOOH to thermal treatment in a non-reducing atmosphere has been known, and in general, and it has also been known that the higher the temperature of thermal treatment, the more effective of the growth of single particle and the higher is the degree of the crystallinity of the thus formed acicular particles of alpha-$Fe_2O_3$.

In the case where the temperature of thermal treatment is higher than 650° C., the sintering proceeds to cause the disintegration of the particles, and accordingly, as a means for preventing the sintering, a method for coating the acicular particles of alpha-FeOOH preliminarily with an organic or inorganic compound(s) having an effect of preventing the sintering has been known. In the present invention, as one of such methods for coating the acicular particles of alpha-FeOOH in advance of the thermal treatment in a non-reducing atmosphere with inorganic compounds, the following treatment is carried out.

After preparing the acicular particles of alpha-FeOOH containing Si, Cr and Ni and optionally containing Mg according to the steps of the present invention, as has been stated, and collecting thereof from the mother liquor, the particles are suspended in water, and after regulating the pH of the thus obtained aqueous suspension higher than 8, 0.1 to 2% by weight of a salt of phosphoric acid (calculated as $PO_3$) to the particles and then 0.1 to 7.0% by weight of a water-soluble silicate (calculated as $SiO_2$) to the particles are added to the aqueous suspension, and thereafter, by adjusting the pH of the aqueous suspension, the acicular particles of alpha-FeOOH containing Si, Cr and Ni and optionally containing Mg coated with a phosphorus compound and a silicon compound are obtained.

Of the thus added two compounds, the water-soluble silicate becomes a silicic compound which coates the acicular particles of alpha FeOOH containing Si, Cr and Ni and optionally containing Mg and serves the role of preventing the sintering. However, the salt of phosphoric acid plays another important role in the present invention, such an effect of the salt of phosphoric acid being found by the present inventor. The situation is as follows:

In general, the acicular particles of alpha-FeOOH containing Si, Cr and Ni and optionally containing Mg, in the step of their crystal growth within the mother liquor at the time of reaction of formation of FeOOH in an aqueous reaction system, form the groups of the particles which are fairly strongly interwound and aggregated together and accordingly, in the case where they are coated with an agent for preventing the sintering as they are, only the sintering is prevented and the state of agglomeration and aggregation is maintained as it was. Accordingly, the acicular ferromagnetic alloy particles containing Si, Cr and Ni and optionally containing Mg, which are obtained by thermal reduction of the acicular particles of alpha-$Fe_2O_3$ containing Si, Cr and Ni and optionally containing Mg obtained by thermal treatment of the above-mentioned interwound and aggregated acicular particles of alpha-FeOOH containing Si, Cr and Ni and optionally containing Mg, are necessarily interwound and aggregated together.

A sufficient dispersibility of such particles in the vehicle and a sufficient orientation and a sufficient packing of such particles in the coating medium cannot be expected.

In this connection, the salt of phosphoric acid added to the aqueous suspension of the acicular particles of alpha-FeOOH containing Si, Cr and Ni and optionally containing Mg before the addition of the water-soluble silicate plays an important role of unwinding and unbinding of the interwound and aggregated particles.

In the step of the addition of the salt of phosphoric acid to the aqueous suspension of the acicular particles of alpha-FeOOH containing Si, Cr and Ni and optionally containing Mg, the concentration of the particles in the aqueous suspension is preferably less than 20% by weight to water in the aqueous suspension, and in the case of over 20% by weight, the viscosity of the aqueous suspension is too large to allow the sufficient action of the thus added salt of phosphoric acid.

The thus added salt of phosphoric acid is adsorbed onto the surface of the acicular particles of alpha-FeOOH, and as will be seen in Tables 3 and 9, the thus coated particles contains 0.157 to 1.80 atomic % calculated as P to Fe of the particle.

In the case where the amount of addition of the salt of phosphoric acid is below 0.1% by weight, the effect of addition is insufficient, and on the other hand, in the case of over 2% by weight, it becomes difficult to separate the coated particles from the aqueous suspension because of the strong and uniform dispersion of the particles although it is possible to unwind thereof.

As the salt of phosphoric acid for that purpose, for instance, sodium metaphosphate and sodium pyrophosphate may be mentioned. The pH of the aqueous suspension to which the salt of phosphoric acid is added should be higher than 8, and in the case of below 8, the necessary amount of the salt of phosphoric acid for unwinding the particles becomes more than 2% by weight, and in such a case, as has been described, it becomes difficult to separate the particles from the aqueous suspension.

Concerning the addition of the water-soluble silicate for forming a membrane of a silicon compound on the surface of the acicular particles of alpha-FeOOH containing Si, Cr and Ni and optionally containing Mg for the prevention of the deformation and the sintering, the addition should be carried out after having unwound and unaggregated the interwinding and aggregating of the particles by the addition of the salt of phosphoric acid, and the pH of the aqueous suspension is preferably over 8 at the time of addition. In the case where the addition of the water-soluble silicate is carried out to the aqueous suspension of pH of below 8, the added salt changes into $SiO_2$ rapidly which singly precipitates at the same time as it is without forming any membrane onto the acicular particles of alpha-FeOOH.

The thus treated acicular particles of alpha-FeOOH contains 0.65 to 7.91 atomic % of Si in total including Si which has been introduced in the reaction of formation of the particle.

The amount of addition of the water-soluble silicate is 0.1 to 7.0% by weight of the acicular particles of alpha-FeOOH containing Si, Cr, Ni and Mg, calculated as $SiO_2$.

In the case of adding the water-soluble silicate for that purpose, in amount of below 0.1% by weight, the effect of addition is not remarkably exhibited, and on the other hand, in the case of over 7.0% by weight, the saturation magnetization of the final product is reduced by the reduction of the purity thereof although the acicular crystalline of FeOOH itself is excellent.

As the water-soluble silicate for use in the present invention, sodium silicate and potassium silicate may be mentioned.

Concerning the conditions in separating and collecting the thus coated acicular particles of alpha-FeOOH containing Si, Cr and Ni and optionally containing Mg coated with a phosphorus compound and a silicone compound from the aqueous suspension, the state of dispersion of the particles in the aqueous suspension is a problem. It is favorable to have the particles suitably coagulated together for filtering the aqueous suspension to collect the particles effectively without any leakage of the particle through the filter mesh and any clogging of the mesh by the too-strongly aggregated clumps of the particles. For that purpose, the pH of the aqueous suspension is adjusted to 3 to 7 after the addition of the water-soluble silicate by using acetic acid, sulfuric acid or phosphoric acid, and the thus adjusted aqueous solution is subjected to filtration by an ordinary means to obtain the coated acicular particles of alpha-FeOOH containing Si, Cr and Ni and optionally containing Mg coated with a phosphorus compound and a silicon compound, which are then thermally treated in a non-reducing atmosphere at a temperature of 500° to 900° C., thereby dehydrated to be the impregnated acicular particles of alpha-$Fe_2O_3$ containing Si, Cr and Ni and optionally containing Mg impregnated with a phosphorus compound and a silicon compound, which are substantially high in density and high in crystallinity and succeed and retain the excellent acicular crystalline in shape without any interwinding and bonding to each other.

In the case where the temperature of the thermal treatment in the non-reducing atmosphere is below 500° C., the degree of crystallinity and the density of the thus obtained particles of alpha-$Fe_2O_3$ which contain Si, Cr and Ni and optionally containing Mg and are impregnated with a phosphorus compound and a silicon compound are not sufficient, and on the other hand, in the case of over 900° C., the deformation of the particles and the sintering of single particle and of between the particles are resulted, and for operation at such a high temperature, it needs industrially uneconomical equipment of high accuracy and techniques.

The final product of the present invention, that is, the acicular ferromagnetic alloy particles containing P, Si, Cr and Ni and optionally containing Mg impregnated with phosphorus compound and silicon compound obtained by the thermal reduction in a reducing gas of the acicular particles of alpha-$Fe_2O_3$ containing Si, Cr and Ni and optionally containing Mg and being impregnated with a phosphorus compound and a silicon compound, which are high in crystallinity, substantially large in density without interwinding and sintering are also substantially large in density as a result of their raised crystallinity in the surface and interior part of the particle and have succeeded and retained the excellent acicular crystal without interwinding and sintering to each other.

The final product of the present invention, that is, the acicular ferromagnetic alloy particles containing P, Si, Cr and Ni and optionally containing Mg impregnated with phosphorus compound and silicon compound thus obtained contain, as will be seen in Tables 5 and 11, 0.64 to 7.91 atomic % of Si; 0.294 to 2.99 atomic % of Cr; 1.98 to 7.00 atomic % of Ni; 0.125 to 1.55 atomic % of P and optionally contain 1.01 to 14.95 atomic % of Mg to Fe of the particle, namely the final product contains almost all of the amounts added thereto.

The temperature of the thermal reduction in a reducing gas is preferably in the range of 350° to 600° C. At the temperature below 350° C., the proceeding of reduction is very slow, and it takes a long time period for completing the reaction, and on the other hand, at a temperature over 600° C., the reduction proceeds rapidly resulting in the deformation of the acicular crystalline particles and the sintering of the particle itself and between the particles.

In the case where the steps of the process according to the present invention are carried out as in the mode indicated before, the present invention exhibits the following effects:

Namely, according to the present invention the acicular ferromagnetic alloy particles containing P, Si, Cr and Ni and optionally containing Mg impregnated with phosphorus compound and silicon compound provided with the following characteristics are obtained. The acicular ferromagnetic alloy particles containing P, Si, Cr and Ni and optionally containing Mg impregnated with phosphorus compound and silicon compound are substantially acicularly crystalline, uniform in particle size, not contaminated by dendrites, not interwound and sintered together and as the results, are high in apparent density and in addition, are substantially high in density as a result of their raised specific surface area and their raised crystallinity in the surface and interior parts thereof, and furthermore, show a high coercive force and a large saturation magnetization. Accordingly, the magnetic particles according to the present invention can be used as the magnetic material for use in magnetic recording of high quality of picture, high output, high sensitivity and high recording density, which is now demanded most eagerly. In addition, in the case where the magnetic particles according to the present invention is used for preparing a magnetic paint, a magnetic recording media, which is low in noise level, excellent in dispersibility in the vehicle, also excellent in orientation and packing in the coated medium and accordingly, is very favorable, can be obtained.

The present invention will be more precisely explained while referring to Examples as follows.

However, the present invention is not restricted to Examples under mentioned. From the foregoing description, one skilled in the art can easily ascertain the essential characteristics of this invention, and without departing from the spirit and scope thereof can make various changes and modifications of the invention to adapt it to various usages and conditions.

In the description of the specification, Examples and Comparative Examples, *Specific surface area* of the particles was measured by BET method; *Axial ratio* (major:minor) and *Length of major axis* of the particles were the average values measured on micrograph of the particles; *Apparent density* of the particles was measured according to "Test Methods of Pigments" of Japanese Industrial Standards(JIS) K 5101/1978; *Amounts of Si, Cr, Ni, Mg and P* in the particles were measured according to JIS K 0119/1979 (General Rules for fluorescent X-ray Analyses) while using "Fluorescent X-ray analyzer Model 3063M" made by RIGAKU-DENKI KOGYO Co. and the *various characteristics* of the magnetic tape were the results measured under the magnetic field of 10 KOe.

Of the following Examples, Examples 1 to 14 are the preparation of the acicular particles of alpha-FeOOH containing Si, Cr and Ni; Examples 15 to 28 are the preparation of the acicular particles of alpha-FeOOH containing Si, Cr and Ni coated with phosphorus compound and silicon compound; Examples 29 to 42 are the preparation of the acicular particles of alpha-$Fe_2O_3$ containing Si, Cr and Ni impregnated with phosphorus compound and silicon compound; Examples 43 to 56 are the preparation of the acicular ferromagnetic alloy particles containing Si, Cr, Ni and P impregnated with phosphorus compound and silicon compound and Examples 57 to 70 are the production of magnetic tapes while using the product of Examples 43 to 56.

On the other hand, Comparative Examples 1 to 5 are a process for production of magnetic tape while using the aciculer ferromagnetic particles prepared in Comparative Example 4.

Of the following examples and comparative examples, Examples 71 to 85 are the preparation of the acicular particles of alpha-FeOOH containing Si, Cr, Ni and Mg; Examples 86 to 100 are the preparation of the acicular particles of alpha-FeOOH containing Si, Cr, Ni and Mg coated with phosphorus compound and silicon compound; Examples 101 to 115 are the preparation of the acicular particles of alpha-$Fe_2O_3$ containing Si, Cr, Ni and Mg impregnated with phosphorus compound and silicon compound; Examples 116 to 130 are the preparation of the acicular ferromagnetic alloy particles containing Si, Cr, Ni, Mg and P impregnated with phosphorus compound and silicon compound and Examples 131 to 145 are the preparation of magnetic tapes by using each of the products respectively prepared in Examples 116 to 130. Comparative Examples 6 to 10 correspond respectively to each of the five steps of the process for producing the magnetic tape without containing Si, Cr, Ni and Mg.

EXAMPLE 1

Into 400 liters of aqueous 5.45N solution of sodium hydroxide into which preliminarily 152 g of sodium silicate (content of $SiO_2$ being 28.55% by weight), 644 g of chromium sulfate, and 2884 g of nickel sulfate had been added so that the aqueous solution contains 0.20 atomic % of Si, 0.50 atomic % of Cr and 3.0 atomic % of Ni to Fe, 300 liters of aqueous solution of ferrous sulfate containing 1.2 mol of $Fe^{2+}/l$ were added, and the mixture was brought into reaction at pH of 14.0 and a temperature of 45° C. to form an aqueous suspension of $Fe(OH)_2$ containing Si, Cr and Ni. Then, air was blown into the thus prepared aqueous suspension at a rate of 1000 liters per minute at a temperature of 50° C. for 6.3 hours to obtain the acicular particles of alpha-FeOOH containing Si, Cr and Ni. The end point of the above-mentioned reaction was judged by the diappearance of blue color formation in a portion of the thus treated aqueous suspension when aqueous potassium ferricyanide was added to the portion after acidifying thereof with hydrochloric acid.

The thus formed particles were collected by filtration and washed with water, a portion thereof being dried and pulverized to be used for evaluating the specified properties of the product.

As a result of X-ray diffraction analysis on the dried and pulverized specimen of the acicular particles of alpha-FeOOH containing Si, Cr and Ni, the acicular particle gave the X-ray diffraction pattern confirming the same crystal structure as that of the particle of alpha-FeOOH.

In addition, as a result of X-ray fluorescence analysis, the thus obtained particles contained 0.204 atomic % of Si, 0.496 atomic % of Cr and 3.02 atomic % of Ni to Fe, and accordingly, it is considered that Si, Cr, Ni and acicular crystals alpha-FeOOH formed a solid solution.

Figure 5:
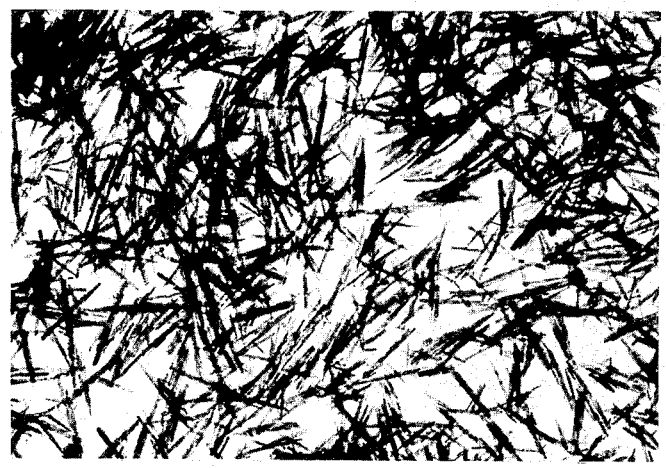
FIGS. 5 to 10 are electron microscope photographs taken at a magnification of 20000 times.

As are seen in the electronmicrophotograph shown in FIG. 5 (20,000 times in magnification), the particle of the product showed an average length of major axis of 0.50 micrometer and the axial ratio (major:minor) of 28:1.

EXAMPLES 2 to 14

By the same procedures as in Example 1 except for changing the kinds and concentration of the aqueous solution of ferrous salt, the concentration of aqueous solution of sodium hydroxide, the kinds, the amount of addition and the time of addition of water-soluble silicate, water-soluble chromium salt and water-soluble nickel salt variously as shown in Table 1, the acicular particles of alpha-FeOOH containing Si, Cr and Ni were prepared. The conditions in preparing the products, and the specific properties of the products are shown in Table 1.

Particularly, the reaction of aqueous suspension of Fe(OH)$_2$ in Example 5 was carried out at 40° C. and the reaction of formation of acicular crystalline alpha-FeOOH was carried out at 45° C.

COMPARATIVE EXAMPLE 1

By the same procedures and under the same conditions as in Example 1, however, without adding sodium silicate, chromium sulfate and nickel sulfate, the acicular particles of alpha-FeOOH were prepared. The main conditions of the preparation are shown in Table 1 and the specific properties of the products are shown in Table 2.

Figure 6:

As seen in the electronmicrophotograph shown in FIG. 6 (20,000 times in magnification), the acicular particles of alpha-FeOOH showed the average length of major axis of 0.45 micrometer, and the axial ratio (major:minor) of 9:1. The product was not uniform in size and contaminated by dendrites.

EXAMPLE 15

In 60 liters of water, 3000 g of a paste of the acicular particles of alpha-FeOOH containing Si, Cr and Ni (corresponding to about 1000 g of the acicular particles of alpha-FeOOH themselves containing Si, Cr and Ni) were suspended, the pH of the aqueous suspension being 9.7.

Into the thus prepared aqueous suspension, 300 ml of an aqueous solution containing 8 g of sodium hexametaphosphate (corresponding to 0.56% by weight of PO$_3$ to the particles of acicular crystalline alpha-FeOOH) were added, and the mixture was stirred for 30 min.

Then, 148 g of sodium silicate (Water glass No. 3) (corresponding to 4.2% by weight of SiO$_2$ to the acicular particles of alpha-FeOOH containing Si, Cr and Ni) were added to the aqueous suspension, and after stirring the aqueous suspension for 60 min, aqueous 10% solution of acetic acid was added to the aqueous suspension to adjust the pH thereof to 5.8.

The thus treated aqueous suspension was filtered to collect the acicular particles of alpha-FeOOH containing Si, Cr and Ni and by drying the particles, the acicular particles of alpha-FeOOH containing Si, Cr and Ni which were coated with phosphorus compound and silicon compound, the specific properties thereof being shown in Table 3.

EXAMPLES 16 to 28

By the same procedures as in Example 15 except for changing the kinds of the particles to be treated, the pH of the aqueous suspension when the phosphate is added, the amount of the phosphate added, the amount of water-soluble silicate and the pH of the aqueous suspension at the time of pH adjusting variously, various kinds of the acicular particles of alpha-FeOOH containing Si, Cr and Ni which were coated with phosphorus compound and silicon compound, were obtained. The conditions for preparing these acicular particles and the specific properties thereof are shown in Table 3.

COMPARATIVE EXAMPLE 2

By the same procedures as in Example 15 except for using the powdery particles obtained in Comparative Example 1 instead of those obtained in Example 1 in Example 15, the acicular particles of alpha-FeOOH coated with phosphorus compound and silicon compound were obtained. The conditions for preparing the acicular particles and the specific properties thereof are also shown in Table 3.

EXAMPLE 29

By the thermal treatment of 1000 g of the acicular particles of alpha-FeOOH containing Si, Cr and Ni coated with phosphorus compound and silicon compound, which were obtained in Example 15 in air at 750° C., the acicular particles of alpha-Fe$_2$O$_3$ containing Si, Cr and Ni impregnated with phosphorus compound and silicon compound were obtained. The thus obtained particles, as a result of observation under electronmicroscope, showed the average length of major axis of 0.48 micrometer and the axial ratio (major:minor) of 26:1, and accordingly, were excellent in acicular crystallinity.

EXAMPLES 30 to 42

By the same thermal treatment as in Example 29 except for using each of the acicular particles prepared in Examples 16 to 28 instead of those prepared in Example 15 under different temperatures and in various non-reducing atmosphere different from those of Example 29, various products of the acicular particles of alpha-Fe$_2$O$_3$ containing Si, Cr and Ni impregnated with phosphorus compound and silicon compound were obtained. The conditions of the thermal treatment and the specific properties of the products are shown in Table 4.

COMPARATIVE EXAMPLE 3

By the same thermal treatment as in Example 29 except for using the acicular particles of alpha-FeOOH coated with phosphorus compound and silicon compound obtained in Comparative Example 2 instead of those prepared in Example 15 in Example 29, the acicular particles of alpha-Fe$_2$O$_3$ impregnated with phosphorus compound and silicon compound were obtained. The product showed the average length of major axis of 0.44 micrometer and an axial ratio (major:minor) of 9:1.

EXAMPLE 43

Into a rotary type reducing vessel of capacity of 3 liters, 120 g of the acicular particles of alpha-Fe$_2$O$_3$ containing Si, Cr and Ni, impregnated with phosphorus compound and silicon co pound prepared in Example 29 were introduced and subjected to reduction by gaseous hydrogen supplied into the vessel at 40 liters/min at a reducing temperature of 440° C. while rotating the vessel. The thus obtained acicular ferromagnetic alloy particles containing Si, Cr and Ni impregnated with phosphorus compound and silicon compound were once immersed into toluene, and by evaporating thereof, a stable oxide membrane was given onto the surface of the particles for preventing the vigorous oxidation when they are drawn out to atmospheric air.

The thus obtained acicular ferromagnetic alloy particles containing Si, Cr, Ni and P impregnated with phosphorus compound and silicon compound, as a result of X-ray diffraction analysis, gave the same diffraction pattern as that of iron showing a single phase of body-centered cubic structure. In addition, the particles contained, as a result of X-ray fluorescence analysis, 4.70 atomic % of Si, 0.495 atomic % of Cr, 3.01 atomic % of Ni and 0.631 atomic % of P, respectively to Fe. Namely, it is considered that iron, Si, Cr, Ni and P form a solid solution in the thus prepared acicular particles.

Figure 7:
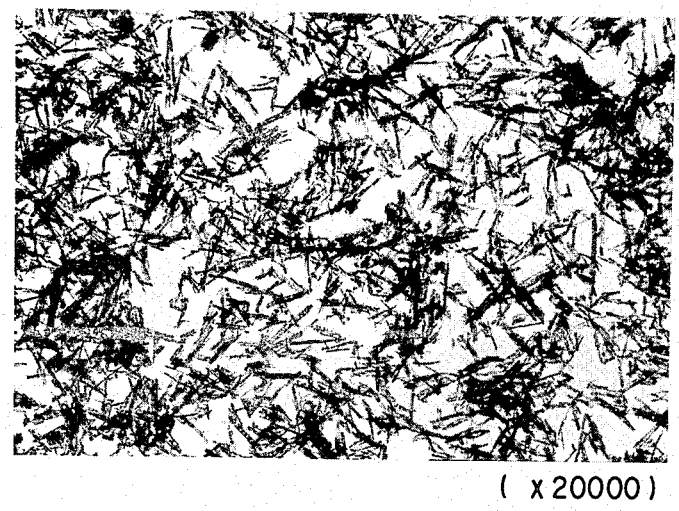

The thus prepared acicular ferromagnetic alloy particle showed the average length of major axis thereof of 0.30 micrometer, the axial ratio (major:minor) of 12:1, the specific surface area of 47.1 m$^2$/g, the apparent density of 0.47 g/ml, the coercive force of 1420 Oe and saturation magnetization of 165.2 emu/g, and as are seen in the electronmicrograph shown in FIG. 7 (magnification of 20,000), are uniform in particle size without contamination by dendrites.

EXAMPLES 44 to 56

By the same procedures as in Example 43 except for using each of the acicular particles of alpha-Fe$_2$O$_3$ containing Si, Cr and Ni impregnated with phosphorus compound and silicon compound prepared in Examples 30 to 42 instead of those prepared in Example 29 and using each of the reducing temperatures shown in Table 5, various kinds of acicular ferromagnetic alloy particles containing Si, Cr, Ni and P impregnated with phosphorus compound and silicon compound, the specific properties thereof being shown in Table 5.

Acicular ferromagnetic alloy particles containing Si, Cr, Ni and P impregnated with phosphorus compound and silicon compound obtained in Examples 44 to 56 are, as a result of observation under an electronmicroscope, uniform in particle size and not contaminated by arborescent particles.

COMPARATIVE EXAMPLE 4

Figure 8:
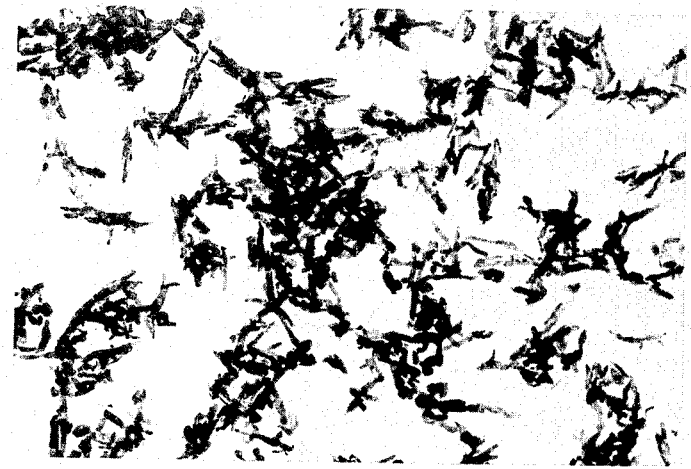

By the same procedures as in Example 43 except for using the acicular particles of alpha-Fe$_2$O$_3$ impregnated with phosphorus compound and silicon compound, obtained in Comparative Example 3 instead of those prepared in Example 29 in Example 43, the acicular ferromagnetic particles were obtained. The product showed the average length of major axis thereof of 0.4 micrometer, the axial ratio(major:minor) of 5:1, the specific surface area of 19.3 m$^2$/g, the apparent density of 0.19 g/ml, the coercive force of 1013 Oe and saturation magnetization of 166.4 emu/g, and as are seen in an electronmicrophotograph shown in FIG. 8, are non uniform in particle size and not favorable in the axial ratio.

EXAMPLE 57

A magnetic paint was prepared by using the acicular ferromagnetic alloy particles containing Si, Cr, Ni and P impregnated with phosphorus compound and silicon compound obtained in Example 43, compounding thereof with a suitable dispersing agent, a copolymer of vinyl chloride and vinyl acetate, a thermoplastic polyurethane resin and a mixed solvent consisting of toluene, methyl ethyl ketone and methyl isobutyl ketone in a predetermined composition and blending the compounded components for 8 hours in a ball mill.

After adding the above-mentioned mixed solvent to the thus prepared magnetic paint to adjust the viscosity thereof to a suitable extent, the thus adjusted magnetic paint was coated onto a polyester film, and by drying the coated film to obtain a magnetic tape showing the coercive force of 1345 Oe, the residual density of magnetic flux(Br) of 3910 Gauss, the Br/Bm of 0.790 and the degree of orientation of 2.02.

EXAMPLES 58 to 70

By the same procedures as in Example 57 except for using each of the products of Examples 44 to 56 instead of those prepared in Example 43 in Example 57, each of the magnetic tapes was produced. The specific properties of the thus obtained magnetic tapes are shown in Table 6.

COMPARATIVE EXAMPLE 5

By the same procedures as in Example 57 except for using the acicular ferromagnetic particles prepared in Comparative Example 4 instead of the product of Example 43, a magnetic tape was produced, of which the specific properties are also shown in Table 6.

TABLE 1

| | Conditions in the preparation of the acicular particles of alpha-FeOOH containing Si, Cr and Ni | | | | | | | | | |
|---|---|---|---|---|---|---|---|---|---|---|
| | Aq. Solution of Fe$^{2+}$ | | | Aq. Solution of NaOH | | Water-soluble Si salt | | | Water-soluble Cr salt | | |
| Classification | Kind | Concentration (mol/l) | Amount used (l) | Concentration (N) | Amount used (l) | Kind | Amount added (atomic %) | Time of addition[1] | Kind | Amount added (atomic %) | Time of addition[1] |
| Example | | | | | | | | | | | |
| 1 | FeSO$_4$ | 1.2 | 300 | 5.45 | 400 | Sodium silicate | 0.20 | B | Cr$_2$(SO$_4$)$_3$ | 0.50 | B |
| 2 | " | " | " | 5.48 | " | Sodium silicate | 0.50 | " | " | 0.70 | " |
| 3 | " | " | " | 6.24 | " | Sodium silicate | 0.35 | " | " | 3.00 | " |
| 4 | " | " | " | 6.21 | " | Sodium silicate | 0.20 | " | " | 1.0 | " |
| 5 | " | " | " | 5.47 | " | Sodium silicate | 0.25 | " | " | 0.5 | " |
| 6 | " | 1.68 | " | 7.20 | " | Sodium silicate | 1.00 | " | " | 0.30 | " |
| 7 | " | " | " | 7.36 | " | Sodium silicate | 0.50 | " | " | 0.40 | " |
| 8 | " | " | " | 7.18 | " | Sodium | 0.50 | " | " | 0.60 | A |

TABLE 1-continued

Conditions in the preparation of the acicular particles of alpha-FeOOH containing Si, Cr and Ni

| | | | | | | | | | | | |
|---|---|---|---|---|---|---|---|---|---|---|---|
| 9 | " | " | " | 7.16 | " | Sodium silicate | 0.40 | " | " | 0.60 | B |
| 10 | " | " | " | 7.18 | " | Sodium silicate | 0.50 | " | " | 0.70 | A |
| 11 | " | 1.20 | " | 6.21 | " | Potassium silicate | 0.35 | " | " | 0.50 | B |
| 12 | " | " | " | 6.20 | " | Sodium silicate | 0.20 | C | " | 0.30 | C |
| 13 | " | " | " | 6.25 | " | Sodium silicate | 0.50 | B | " | 1.0 | D |
| 14 | FeCl₂ | 1.68 | " | 7.16 | " | Sodium silicate | 0.35 | " | CrCl₃ | 0.5 | B |
| Comparative Example | | | | | | | | | | | |
| 1 | FeSO₄ | 1.2 | " | 5.30 | " | — | — | — | — | — | — |

| Classification | Aq. Solution of Ni salt | | | Reaction time (hours) |
|---|---|---|---|---|
| | Kind | Amount added (atomic %) | Time of addition[1] | |
| Example | | | | |
| 1 | NiSO₄ | 3.0 | B | 6.3 |
| 2 | " | 5.0 | " | 6.9 |
| 3 | " | 4.0 | " | 6.8 |
| 4 | " | 2.0 | " | 7.0 |
| 5 | " | 5.0 | " | 6.0 |
| 6 | " | 5.0 | " | 7.9 |
| 7 | " | 7.0 | " | 9.9 |
| 8 | " | 4.0 | " | 9.3 |
| 9 | " | 3.0 | A | 9.5 |
| 10 | " | 3.0 | " | 9.3 |
| 11 | " | 4.0 | B | 6.9 |
| 12 | " | 3.0 | C | 7.0 |
| 13 | " | 3.0 | D | 6.3 |
| 14 | NiCl₂ | 4.0 | B | 9.9 |
| Comparative Example | | | | |
| 1 | — | — | — | 12.0 |

Note:
[1]Time of addition:
A means to add to the aqueous solution of Ferrous salt.
B means to add to the aqueous solution of an alkali.
C means to add to the aqueous suspension in which Fe(OH)₂ is formed.
D means to add to the reaction system in which the acicular particles of alpha-FeOOH containing Si, Cr and Ni.

TABLE 2

| | Composition of acicular particles of alpha-FeOOH | | | Specificity of acicular particle | |
|---|---|---|---|---|---|
| Classification | Si/Fe (atomic %) | Cr/Fe (atomic %) | Ni/Fe (atomic %) | Length of major axis (μm) | Axial ratio (major:minor) |
| Example | | | | | |
| 1 | 0.204 | 0.496 | 3.02 | 0.50 | 28:1 |
| 2 | 0.505 | 0.695 | 5.04 | 0.45 | 25:1 |
| 3 | 0.355 | 2.99 | 4.03 | 0.40 | 20:1 |
| 4 | 0.203 | 0.996 | 2.05 | 0.44 | 28:1 |
| 5 | 0.257 | 0.497 | 5.01 | 0.38 | 30:1 |
| 6 | 1.03 | 0.298 | 5.02 | 0.45 | 25:1 |
| 7 | 0.500 | 0.399 | 7.00 | 0.48 | 30:1 |
| 8 | 0.500 | 0.596 | 4.00 | 0.60 | 25:1 |
| 9 | 0.403 | 0.600 | 3.03 | 0.60 | 28:1 |
| 10 | 0.505 | 0.698 | 3.04 | 0.55 | 28:1 |
| 11 | 0.354 | 0.495 | 4.02 | 0.55 | 30:1 |
| 12 | 0.204 | 0.296 | 3.03 | 0.60 | 35:1 |
| 13 | 0.504 | 0.996 | 3.05 | 0.45 | 30:1 |
| 14 | 0.354 | 0.496 | 4.02 | 0.50 | 28:1 |
| Comparative Example | | | | | |
| 1 | — | — | — | 0.45 | 9:1 |

TABLE 3

Conditions for preparation of acicular particles of alpha-FeOOH coated with phosphorus compound and silicon compound and properties thereof

| Classification | Kind of particle to be treated, obtained in | pH of aqueous suspension | Treated with Wt. % P-comp. amount of addition | Treated with Wt. % S-comp. amount of addition | Adjusted pH | Composition of P— and Si— coated particle Si/Fe (atomic %) | Cr/Fe (atomic %) | Ni/Fe (atomic %) | P/Fe (atomic %) |
|---|---|---|---|---|---|---|---|---|---|
| Example | Example | | | | | | | | |
| 15 | 1 | 9.7 | 0.56 | 4.2 | 5.8 | 4.70 | 0.496 | 3.01 | 0.631 |
| 16 | 2 | 9.8 | 0.49 | 3.7 | 6.0 | 4.61 | 0.694 | 5.00 | 0.550 |
| 17 | 3 | 9.8 | 0.42 | 0.29 | 5.0 | 0.65 | 2.99 | 3.99 | 0.475 |
| 18 | 4 | 9.6 | 0.56 | 1.7 | 6.0 | 2.10 | 0.996 | 2.02 | 0.630 |
| 19 | 5 | 9.9 | 0.49 | 3.7 | 6.0 | 4.25 | 0.497 | 5.01 | 0.552 |
| 20 | 6 | 10.0 | 0.70 | 3.4 | 5.5 | 4.82 | 0.298 | 5.00 | 0.790 |
| 21 | 7 | 9.7 | 0.35 | 4.0 | 6.5 | 4.64 | 0.399 | 7.01 | 0.391 |
| 22 | 8 | 9.8 | 1.55 | 1.1 | 6.0 | 1.68 | 0.596 | 4.00 | 1.737 |
| 23 | 9 | 9.6 | 0.56 | 4.2 | 6.0 | 4.84 | 0.599 | 3.01 | 0.631 |
| 24 | 10 | 9.6 | 0.49 | 3.7 | 5.8 | 4.35 | 0.698 | 3.02 | 0.551 |
| 25 | 11 | 9.8 | 0.42 | 2.9 | 6.0 | 3.32 | 0.494 | 4.00 | 0.474 |
| 26 | 12 | 9.7 | 0.49 | 2.3 | 5.5 | 2.88 | 0.296 | 3.01 | 0.550 |
| 27 | 13 | 9.7 | 0.14 | 6.3 | 6.0 | 7.05 | 0.996 | 3.03 | 0.158 |
| 28 | 14 | 9.5 | 0.56 | 3.7 | 5.5 | 4.25 | 0.495 | 4.00 | 0.632 |
| Comparative Example | Comparative Example | | | | | | | | |
| 2 | 1 | 9.6 | 0.56 | 3.7 | 6.0 | 3.80 | — | — | 0.630 |

TABLE 4

Conditions in preparation of the acicular particles of alpha-Fe$_2$O$_3$ coated with phosphorus compounds and silicon compounds and the specific properties thereof

| Classification | Particles of alpha-FeOOH prepared in[1] | Thermal treatment Temperature (°C.) | Thermal treatment Atmosphere | Particles of alpha-Fe$_2$O$_3$[2] Length of major axis (μm) | Axial ratio (major:minor) |
|---|---|---|---|---|---|
| Example | Example | | | | |
| 29 | 15 | 750 | air | 0.48 | 26:1 |
| 30 | 16 | 770 | " | 0.44 | 24:1 |
| 31 | 17 | 500 | " | 0.40 | 20:1 |
| 32 | 18 | 600 | " | 0.44 | 28:1 |
| 33 | 19 | 750 | " | 0.37 | 29:1 |
| 34 | 20 | 780 | " | 0.44 | 24:1 |
| 35 | 21 | 800 | " | 0.46 | 27:1 |
| 36 | 22 | 550 | N$_2$ gas | 0.60 | 24:1 |
| 37 | 23 | 810 | " | 0.57 | 26:1 |
| 38 | 24 | 730 | " | 0.54 | 27:1 |
| 39 | 25 | 650 | air | 0.55 | 30:1 |
| 40 | 26 | 780 | " | 0.58 | 34:1 |
| 41 | 27 | 850 | " | 0.42 | 28:1 |
| 42 | 28 | 750 | N$_2$ gas | 0.48 | 28:1 |
| Comparative Example | Comparative Example | | | | |
| 3 | 2 | 770 | air | 0.44 | 9:1 |

Notes:
[1]Acicular particles of alpha-FeOOH containing Si, Cr and Ni coated with phosphorus compound and silicon compound.
[2]Acicular particles of alpha-Fe$_2$O$_3$ containing Si, Cr and Ni coated with phosphorus compound and silicon compound.

TABLE 5

Conditions in preparing the acicular ferromagnetic alloy particles and the specific properties thereof

| Classification | Particles of alpha-Fe$_2$O$_3$ obtained in[1] | Temperature of reduction (°C.) | Si/Fe (atomic %) | Cr/Fe (atomic %) | Ni/Fe (atomic %) | P/Fe (atomic %) | Length of major axis (μm) | Axial ratio (major:minor) | Specific surface area (m$^2$/g) | Saturation magnetization (emu/g) | Coercive force (Oe) |
|---|---|---|---|---|---|---|---|---|---|---|---|
| Example | Example | | | | | | | | | | |
| 43 | 29 | 440 | 4.70 | 0.495 | 3.01 | 0.631 | 0.30 | 12:1 | 47.1 | 165.2 | 1420 |
| 44 | 30 | 450 | 4.60 | 0.694 | 5.00 | 0.550 | 0.29 | 12:1 | 48.4 | 166.0 | 1400 |
| 45 | 31 | 380 | 0.65 | 2.99 | 3.99 | 0.475 | 0.31 | 14:1 | 54.0 | 149.3 | 1280 |
| 46 | 32 | 400 | 2.11 | 0.996 | 2.02 | 0.630 | 0.29 | 13:1 | 48.9 | 154.2 | 1390 |
| 47 | 33 | 420 | 4.25 | 0.496 | 5.00 | 0.551 | 0.25 | 14:1 | 49.5 | 163.6 | 1480 |
| 48 | 34 | 440 | 4.80 | 0.298 | 5.00 | 0.790 | 0.29 | 12:1 | 45.0 | 157.3 | 1350 |
| 49 | 35 | 460 | 4.64 | 0.399 | 7.00 | 0.390 | 0.30 | 15:1 | 47.8 | 165.4 | 1524 |

TABLE 5-continued

Conditions in preparing the acicular ferromagnetic alloy particles and the specific properties thereof

| Classification | Particles of alpha-Fe$_2$O$_3$ obtained in[1] | Temperature of reduction (°C.) | Si/Fe (atomic %) | Cr/Fe (atomic %) | Ni/Fe (atomic %) | P/Fe (atomic %) | Length of major axis (μm) | Axial ratio (major:minor) | Specific surface area (m$^2$/g) | Saturation magnetization (emu/g) | Coercive force (Oe) |
|---|---|---|---|---|---|---|---|---|---|---|---|
| 50 | 36 | 400 | 1.69 | 0.596 | 3.99 | 1.737 | 0.38 | 13:1 | 46.6 | 160.5 | 1370 |
| 51 | 37 | 490 | 4.84 | 0.599 | 3.00 | 0.631 | 0.36 | 12:1 | 46.1 | 154.9 | 1360 |
| 52 | 38 | 440 | 4.35 | 0.697 | 3.02 | 0.550 | 0.34 | 14:1 | 48.3 | 164.0 | 1390 |
| 53 | 39 | 420 | 3.31 | 0.494 | 4.00 | 0.474 | 0.35 | 14:1 | 47.0 | 160.1 | 1465 |
| 54 | 40 | 420 | 2.88 | 0.296 | 3.01 | 0.550 | 0.34 | 13:1 | 45.7 | 157.3 | 1450 |
| 55 | 41 | 530 | 7.04 | 0.996 | 3.03 | 0.157 | 0.25 | 11:1 | 40.8 | 163.0 | 1270 |
| 56 | 42 | 420 | 4.25 | 0.495 | 4.00 | 0.632 | 0.29 | 14:1 | 47.4 | 159.6 | 1460 |
| Comparative Example 4 | Comparative Example 3 | 460 | 3.80 | — | — | 0.630 | 0.4 | 5:1 | 19.3 | 166.4 | 1013 |

Notes:
[1]Acicular particles of alpha-Fe$_2$O$_3$ containing Si, Cr and Ni impregnated with phosphorus compound and silicon compound.
[2]Acicular ferromagnetic alloy particles containing Si, Cr and Ni and P impregnated with phosphorus compound and silicon compound.

TABLE 6

Kind of acicular ferromagnetic alloy particles and properties of magnetic tape

| Classification | Acicular ferromagnetic alloy particles obtained in | Coercive force (Oe) | Residual magnetic flux density (Br) (Gauss) | Squareness ratio (Br/Bm) | Orientation ratio[1] |
|---|---|---|---|---|---|
| Example 57 | Example 43 | 1345 | 3910 | 0.790 | 2.02 |
| 58 | 44 | 1326 | 3850 | 0.782 | 2.00 |
| 59 | 45 | 1230 | 3820 | 0.784 | 1.96 |
| 60 | 46 | 1310 | 3880 | 0.791 | 2.01 |
| 61 | 47 | 1410 | 3960 | 0.809 | 2.25 |
| 62 | 48 | 1275 | 3630 | 0.754 | 1.89 |
| 63 | 49 | 1456 | 4040 | 0.814 | 2.41 |
| 64 | 50 | 1305 | 3760 | 0.784 | 1.95 |
| 65 | 51 | 1302 | 3640 | 0.765 | 1.92 |
| 66 | 52 | 1320 | 3840 | 0.787 | 2.07 |
| 67 | 53 | 1406 | 3900 | 0.805 | 2.18 |
| 68 | 54 | 1394 | 3740 | 0.795 | 2.00 |
| 69 | 55 | 1190 | 3670 | 0.745 | 1.89 |
| 70 | 56 | 1395 | 3940 | 0.810 | 2.33 |
| Comparative Example 5 | Comparative Example 4 | 830 | 2640 | 0.657 | 1.57 |

Note:
[1]Orientation ratio is calculated by the formula:
$$\frac{(Br/Bm)\ parallel}{(Br/Bm)\ perpendicular}$$

EXAMPLE 71

Into 400 liters of aqueous 5.46N solution of sodium hydroxide to which preliminarily 379 g of sodium silicate (No. 3, containing 28.55% by weight of SiO$_2$), 644 g of chromium sulfate, 2884 g of nickel sulfate and 4473 g of magnesium sulfate were added to make the solution contain 0.50 atomic % of Si, 0.50 atomic % of Cr, 3.0 atomic % of Ni and 5.0 atomic % of Mg, respectively to Fe, and which had been introduced in a reactor; 300 liters of aqueous solution of ferrous sulfate containing 1.2 mol of Fe$^{2+}$/liter were added, and a reaction was carried out at the pH of 13.8 and a temperature of 45° C. in the liquid mixture to form an aqueous suspension of Fe(OH)$_2$ containing Si, Cr, Ni and Mg.

Into the thus formed aqueous suspension of Fe(OH)$_2$ containing Si, Cr, Ni and Mg, air was blown at a temperature of 50° C. and at a rate of 1000 liters/min for 5.1 hours to prepare the acicular particles of alpha-FeOOH containing Si, Cr, Ni and Mg, the end point of the above-mentioned oxidation being judged by the presence or absence of blue-colour reaction of Fe$^{2+}$ appearing when a part of the reaction mixture was drawn out and after acidifying thereof with hydrochloric acid, aqueous solution of potassium ferricyanide was added thereto.

The formed particles were collected by filtering the reaction mixture and washed with water in an ordinary method, and a part of the washed particles was dried and pulverized to be a specimen for evaluating the specific properties of the thus prepared acicular particles of alpha-FeOOH.

As a result of X-ray diffraction analysis, the acicular particles of alpha-FeOOH gave the same X-ray diffraction pattern as that of an authentic specimen of the acicular particles of alpha-FeOOH.

In addition, as a result of X-ray fluorescence analysis, it was found that the particle contained 0.504 atomic % of Si, 0.498 atomic % of Cr, 3.03 atomic % of Ni and 4.98 atomic % of Mg, respectively to Fe.

Accordingly, it is considered that Si, Cr, Ni and Mg are dissolved in the acicular particle of alpha-FeOOH while forming a solid solution.

Figure 9:
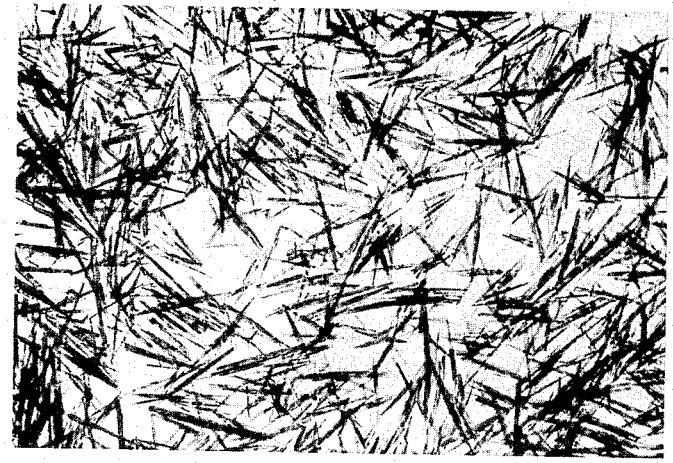

As is seen in the electron micrograph of the herein obtained acicular particles of alpha-FeOOH containing Si, Cr, Ni and Mg, shown in FIG. 9 (magnification of 20,000 times), the particle had an average length of the major axis of 0.55 micrometer and the axial ratio (major:minor) of 33:1.

EXAMPLES 72 to 85

By the same procedures in Example 71 except for changing the kinds, the concentration of the aqueous solution of the ferrous salt, the concentration of aqueous solution of sodium hydroxide and the kinds, the amount added, the time of addition of water-soluble silicate, water-soluble chrome salt, water-soluble nickel salt and water-soluble magnesium salt respectively the corresponding acicular particles of alpha-FeOOH containing Si, Cr, Ni and Mg were prepared, the main conditions of their preparation being shown in Table 7, and the specific properties of the thus obtained respective particles being shown in Table 8.

EXAMPLE 86

In 50 liters of water, 3300 g of a paste of the acicular particles of alpha-FeOOH containing Si, Cr, Ni and Mg obtained by the reaction, filtration and the water-washing in Example 71 (corresponding to about 1000 g of the dried acicular particles of alpha-FeOOH containing Si, Cr, Ni and Mg) were suspended, the pH of the thus prepared aqueous suspension being 10.0.

In the thus prepared aqueous suspension, 300 ml of aqueous solution containing 8 g of sodium hexametaphosphate (corresponding to 0.56% by weight of $PO_3$ to the acicular particles of alpha-FeOOH containing Si, Cr, Ni and Mg) were added, and the mixture was stirred for 30 min.

Then, after adding 130 g of sodium silicate (water glass No. 3, corresponding to 3.7% by weight of $SiO_2$ to the acicular particles of alpha-FeOOH containing Si, Cr, Ni and Mg) to the aqueous suspension and stirring thereof for 60 min, aqueous 10% solution of acetic acid was added to the aqueous solution to adjust the pH thereof to 6.0, and the acicular particles of alpha-FeOOH containing Si, Cr, Ni and Mg were collected by subjecting the thus treated aqueous suspension to a press-filter and by drying the collected product, the acicular particles of alpha-FeOOH which contained Si, Cr, Ni and Mg and are coated with phosphorus compound and silicon compound were obtained, the specific properties of the thus obtained product are shown in Table 9.

EXAMPLES 87 to 100

By the same procedures as in Example 86 except for changing the kind of the particles to be treated, the pH of the aqueous suspension at the time of addition of the phosphate, the respective amounts of the phosphate and water-soluble silicate and the pH after adjusting, variously, the acicular particles of alpha-FeOOH containing Si, Cr, Ni and Mg, which were coated with phosphorus compound and silicone compound were obtained. The main conditions of the procedures and the specific properties of the thus obtained products are shown in Table 9.

EXAMPLE 101

Acicular particles of alpha-$Fe_2O_3$ containing Si, Cr, Ni and Mg, which were impregnated with phosphorus compound and silicone compound were obtained by thermal treatment of 700 g of the acicular particles of alpha-FeOOH containing Si, Cr, Ni and Mg, which were coated with phosphorus compound and silicon compound and had been obtained in Example 86, in air at 780° C.

As a result of electron microscopical observation of the thus obtained product, the powder particles had an average length of the long axis of 0.54 micrometer and an axial ratio (major:minor) of 31:1, and accordingly, they were excellent in acicularity.

EXAMPLES 102 to 115

By the same procedure as in Example 101 except for changing the kinds of acicular particles of alpha-FeOOH containing Si, Cr, Ni and Mg, which were coated with phosphorus compound and silicon compound as the starting material the temperature of thermal treatment and the non-reductive atmosphere, various kinds of the acicular particles of alpha-$Fe_2O_3$ containing Si, Cr, Ni and Mg, which were impregnated with phosphorus compound and silicon compound were obtained. The major conditions in the thermal treatment and the specific properties of the thus prepared product are shown in Table 10.

EXAMPLE 116

Into a rotary vessel for reduction of 3 liters in capacity, 120 g of the product obtained in Example 101 (acicular particles of alpha-$Fe_2O_3$ containing Si, Cr, Ni and Mg impregnated with phosphorus compound and silicon compound) were introduced, and subjected to reduction by a flow of gaseous hydrogen at a rate of 35 liters/min and at a reduction temperature of 480° C. while rotating the vessel. For preventing the violent oxidation of the thus obtained acicular ferromagnetic alloy particles when drawn out in air, the product was once immersed in toluene and then, by evaporating toluene, a stable oxide membrane was given onto the surface of the particles.

As a result of X-ray diffraction test, the thus obtained acicular ferromagnetic alloy particles containing Si, Cr, Ni and Mg impregnated with phosphorus compound and silicon compound, gave an X-ray diffraction pattern showing the same single phase of body-centered cubic structure as that of iron, and as a result of X-ray fluorescence analysis, the product contained 4.33 atomic % of Si, 0.499 atomic % of Cr, 3.03 atomic % of Ni, 4.96 atomic % of Mg and 0.630 atomic % of P, respectively to Fe.

Accordingly, it is considered that Fe, Si, Cr, Ni, Mg and P are in a state of solid solution.

The acicular ferromagnetic alloy particles containing Si, Cr, Ni, Mg and P impregnated with phosphorus compound and silicon compound, showed the average length of the major axis of 0.25 micrometer, the axial ratio (Major:minor) of 11:1, the specific surface area of 52.4 m$^2$/g, the apparent density of 0.45 g/ml, the coercive force of 1551 Oe and the saturation magnetization of 157.3 emu/g.

Figure 10:

In addition, as are seen in the electronmicrophotograph shown in FIG. 10, the thus obtained acicular particles were uniform in particle size without being contaminated by dendrites.

EXAMPLES 117 to 130

By the same procedures as in Example 116 except for changing the kinds of the starting material and the reducing temperature variously as shown in Table 11, several products of the acicular ferromagnetic alloy particles containing Si, Cr, Ni, Mg and P impregnated with phosphorus compound and silicon compound were obtained. The specific properties are shown in Table 11.

The acicular ferromagnetic alloy particles containing Si, Cr, Ni, Mg and P impregnated with phosphorus compound and silicon compound were, according to the result of electronmicrographic observation thereof, were uniform in particle size and not contaminated with arborescent particles.

EXAMPLE 131

After compounding the acicular ferromagnetic alloy particles containing Si, Cr, Ni, Mg and P impregnated with phosphorus compound and silicon compound, obtained in Example 116 with a suitable amount of a dispersing agent, a copolymer of vinyl chloride and vinyl acetate, a thermoplastic polyurethane resin and a mixed solvent comprising toluene, methyl ethyl ketone and methyl isobutyl ketone to a predetermined composition, the thus mixed compound was treated in a ball mill for 8 hours to obtain a magnetic paint.

After adding the mixed solvent to the thus obtained magnetic paint to adjust the viscosity thereof to a suitable value, the thus adjusted magnetic paint was coated on a polyester film by a conventional method and after drying the coated film, a magnetic tape was prepared.

The thus prepared magnetic tape showed the coercive force, Hc, of 1454 Oe, the residual magnetic flux density, Br, of 3980 Gauss, Br/Bm, of 0.793 and the orientation ratio of 2.06.

EXAMPLES 132 to 145

By the same procedures as in Example 131 except for changing the kinds of the starting materials, the acicular ferromagnetic alloy particles produced in the respective Examples 117 to 130, several magnetic tapes were produced. The specific properties of the thus produced magnetic tapes are shown in Table 12.

TABLE 7

Conditions in the preparation of the acicular particles of alpha-FeOOH containing Si, Cr, Ni and Mg

| Classi-fication | Aq. Solution of $Fe^{2+}$ | | | Aq. Solution of NaOH | | Water-soluble Si salt | | | Water-soluble Cr salt | | |
|---|---|---|---|---|---|---|---|---|---|---|---|
| | Kind | Concentration (mol/l) | Amount used (l) | Concentration (N) | Amount used (l) | Kind | Amount added (atomic %) | Time of addition[1] | Kind | Amount added (atomic %) | Time of addition[1] |
| Example 71 | FeSO$_4$ | 1.20 | 300 | 5.46 | 400 | Sodium silicate | 0.50 | B | Cr$_2$(SO$_4$)$_3$ | 0.50 | B |
| 72 | " | 1.68 | " | 7.64 | " | Sodium silicate | 0.35 | " | " | 0.50 | " |
| 73 | " | " | " | 7.26 | " | Sodium silicate | 0.50 | " | " | 1.0 | " |
| 74 | " | " | " | 7.31 | " | Sodium silicate | 0.20 | " | " | 0.3 | " |
| 75 | " | " | " | 7.51 | " | Sodium silicate | 0.50 | " | " | 0.7 | " |
| 76 | " | 1.2 | " | 6.49 | " | Sodium silicate | 0.35 | " | " | 0.4 | " |
| 77 | " | " | " | 6.42 | " | Sodium silicate | 0.20 | " | " | 3.0 | " |
| 78 | " | " | " | 6.26 | " | Sodium silicate | 1.00 | " | " | 0.30 | " |
| 79 | " | 1.68 | " | 7.10 | " | Sodium silicate | 0.35 | " | " | 0.60 | A |
| 80 | " | " | " | 7.47 | " | Sodium silicate | 0.20 | " | " | 0.50 | B |
| 81 | FeCl$_2$ | " | " | 7.29 | " | Sodium silicate | 0.35 | " | CrCl$_3$ | 0.50 | " |
| 82 | FeSO$_4$ | " | " | 7.47 | " | Potassium silicate | 0.35 | " | Cr$_2$(SO$_4$)$_3$ | 0.50 | " |
| 83 | " | " | " | 7.46 | " | Sodium silicate | 0.20 | " | " | 0.40 | A |
| 84 | " | 1.2 | " | 6.51 | " | Sodium silicate | 0.20 | C | " | 0.50 | C |
| 85 | " | " | " | 6.42 | " | Sodium silicate | 0.20 | B | " | 0.50 | D |
| Comparative Example 1 | " | " | " | 5.30 | " | — | — | — | — | — | — |

| Classification | Aq. Solution of Ni salt | | | Aq. Solution of Mg salt | | | Reaction time (hours) |
|---|---|---|---|---|---|---|---|
| | Kind | Amount added (atomic %) | Time of addition[1] | Kind | Amount added (atomic %) | Time of addition[1] | |
| Example 71 | NiSO$_4$ | 3.0 | B | MgSO$_4$ | 5.0 | B | 5.1 |
| 72 | " | 5.0 | " | " | 3.0 | " | 8.8 |
| 73 | " | 4.0 | " | " | 2.0 | " | 9.0 |
| 74 | " | 2.0 | " | " | 7.0 | A | 10.4 |
| 75 | " | 3.0 | " | " | 10.0 | B | 8.0 |

TABLE 7-continued

| 76 | " | 2.0 | " | " | 15.0 | " | | 5.3 |
| 77 | " | 4.0 | " | " | 5.0 | " | | 6.5 |
| 78 | " | 3.0 | " | " | 1.0 | " | | 4.2 |
| 79 | " | " | " | " | 4.0 | " | | 8.8 |
| 80 | " | " | A | " | 5.0 | " | | 8.5 |
| 81 | NiCl$_2$ | " | B | MgCl$_2$ | " | " | | 8.8 |
| 82 | NiSO$_4$ | 3.0 | " | MgSO$_4$ | " | " | | 8.8 |
| 83 | " | " | A | " | " | " | A | 9.0 |
| 84 | " | " | C | " | " | " | C | 8.6 |
| 85 | " | " | D | " | " | " | D | 8.8 |
| Comparative Example | | | | | | | | |
| 1 | — | — | — | — | — | — | | 12.0 |

Note:
(1)Time of addition:
A means to add to the aqueous solution of Ferrous salt.
B means to add to the aqueous solution of an alkali.
C means to add to the aqueous suspension in which Fe(OH)$_2$ is formed.
D means to add to the reaction system in which the acicular particles of alpha-FeOOH containing Si, Cr, Ni and Mg.

TABLE 8

| | Composition of acicular particles of alpha-FeOOH | | | | Specificity of powder particle | |
|---|---|---|---|---|---|---|
| Classification | Si/Fe (atomic %) | Cr/Fe (atomic %) | Ni/Fe (atomic %) | Mg/Fe (atomic %) | Length of major axis (μm) | Axial ratio (major:minor) |
| Example | | | | | | |
| 71 | 0.504 | 0.498 | 3.03 | 4.98 | 0.55 | 33:1 |
| 72 | 0.353 | 0.495 | 5.00 | 3.00 | 0.65 | 45:1 |
| 73 | 0.502 | 0.994 | 4.04 | 2.01 | 0.60 | 35:1 |
| 74 | 0.203 | 0.296 | 2.01 | 6.98 | 0.60 | 40:1 |
| 75 | 0.505 | 0.695 | 3.04 | 10.02 | 0.62 | 37:1 |
| 76 | 0.354 | 0.398 | 2.01 | 14.94 | 0.60 | 35:1 |
| 77 | 0.205 | 2.97 | 4.02 | 4.97 | 0.64 | 35:1 |
| 78 | 1.06 | 0.299 | 3.05 | 1.01 | 0.60 | 33:1 |
| 79 | 0.356 | 0.600 | 3.04 | 4.00 | 0.63 | 40:1 |
| 80 | 0.207 | 0.496 | 3.01 | 5.05 | 0.60 | 40:1 |
| 81 | 0.355 | 0.498 | 3.02 | 4.97 | 0.65 | 40:1 |
| 82 | 0.353 | 0.497 | 3.02 | 4.98 | 0.65 | 40:1 |
| 83 | 0.201 | 0.317 | 3.04 | 5.02 | 0.62 | 35:1 |
| 84 | 0.206 | 0.496 | 3.03 | 5.02 | 0.65 | 40:1 |
| 85 | 0.206 | 0.496 | 3.03 | 4.96 | 0.65 | 40:1 |
| Comparative Example | | | | | | |
| 1 | — | — | — | — | 0.45 | 9:1 |

TABLE 9

Conditions for preparation of acicular particles of alpha-FeOOH coated with phosphorus compound and silicon compound and properties thereof

| Classification | Kind of particle to be treated, obtained in | pH of aqueous suspension | Treated with wt. % P—comp. amount of addition | Treated with wt. % S—comp. amount of addition | Adjusted pH | Composition of P— and Si— coated particles Si/Fe (atomic %) | Cr/Fe (atomic %) | Ni/Fe (atomic %) | Mg/Fe (atomic %) | P/Fe (atomic %) |
|---|---|---|---|---|---|---|---|---|---|---|
| Example | Example | | | | | | | | | |
| 86 | 71 | 10.0 | 0.56 | 3.7 | 6.0 | 4.34 | 0.498 | 3.03 | 4.96 | 0.630 |
| 87 | 72 | 10.0 | 0.42 | 3.4 | 6.0 | 3.89 | 0.495 | 5.00 | 3.00 | 0.470 |
| 88 | 73 | 9.9 | 0.24 | 5.7 | 6.0 | 6.41 | 0.994 | 4.04 | 2.01 | 0.269 |
| 89 | 74 | 9.8 | 0.70 | 1.7 | 5.5 | 1.98 | 0.295 | 2.00 | 6.96 | 0.788 |
| 90 | 75 | 10.0 | 0.49 | 0.86 | 6.5 | 1.40 | 0.695 | 3.01 | 10.01 | 0.549 |
| 91 | 76 | 10.0 | 0.56 | 0.29 | 5.0 | 0.65 | 0.398 | 2.00 | 14.94 | 0.629 |
| 92 | 77 | 9.8 | 0.42 | 1.43 | 6.0 | 1.68 | 2.97 | 4.02 | 4.97 | 0.469 |
| 93 | 78 | 9.9 | 0.14 | 6.6 | 5.5 | 7.91 | 0.298 | 3.02 | 1.01 | 0.157 |
| 94 | 79 | 9.8 | 0.56 | 2.9 | 6.0 | 3.31 | 0.599 | 3.04 | 4.00 | 0.630 |
| 95 | 80 | 9.7 | 0.28 | 3.4 | 6.0 | 3.75 | 0.496 | 3.00 | 5.05 | 0.313 |
| 96 | 81 | 9.9 | 1.62 | 0.86 | 5.5 | 1.24 | 0.498 | 3.00 | 4.95 | 1.80 |
| 97 | 82 | 9.7 | 0.56 | 3.7 | 5.5 | 4.20 | 0.497 | 3.01 | 4.98 | 0.628 |
| 98 | 83 | 9.8 | 0.49 | 4.3 | 5.5 | 4.64 | 0.316 | 3.02 | 5.01 | 0.548 |
| 99 | 84 | 9.9 | 0.56 | 2.9 | 6.0 | 3.16 | 0.496 | 3.03 | 5.02 | 0.629 |
| 100 | 85 | 9.8 | 0.49 | 3.7 | 6.0 | 4.05 | 0.495 | 3.03 | 4.96 | 0.550 |
| Comparative Example | Comparative Example | | | | | | | | | |
| 2 | 1 | 9.6 | 0.56 | 3.7 | 6.0 | 3.80 | — | — | — | 0.630 |

TABLE 9-continued

Conditions for preparation of acicular particles of alpha-FeOOH coated with phosphorus compound and silicon compound and properties thereof

| Classification | Kind of particle to be treated, obtained in | pH of aqueous suspension | Treated with wt. % P—comp. amount of addition | Treated with wt. % S—comp. amount of addition | Adjusted pH | Composition of P— and Si— coated particles Si/Fe (atomic %) | Cr/Fe (atomic %) | Ni/Fe (atomic %) | Mg/Fe (atomic %) | P/Fe (atomic %) |
|---|---|---|---|---|---|---|---|---|---|---|

TABLE 10

Conditions in preparation of the acicular particles of alpha-$Fe_2O_3$ impregnated with phosphorus compounds and silicon compounds and the specific properties thereof

| Classification | Particles of alpha-FeOOH prepared in[1] | Thermal treatment Temperature (°C.) | Atmosphere | Particles of alpha-$Fe_2O_3$[2] Length of major axis (μm) | Axial ratio (major:minor) |
|---|---|---|---|---|---|
| Example | Example | | | | |
| 101 | 86 | 780 | air | 0.54 | 31:1 |
| 102 | 87 | 750 | " | 0.64 | 44:1 |
| 103 | 88 | 800 | " | 0.58 | 32:1 |
| 104 | 89 | 770 | " | 0.60 | 38:1 |
| 105 | 90 | 600 | " | 0.62 | 36:1 |
| 106 | 91 | 500 | " | 0.60 | 35:1 |
| 107 | 92 | 700 | " | 0.64 | 34:1 |
| 108 | 93 | 850 | " | 0.56 | 30:1 |
| 109 | 94 | 750 | $N_2$ gas | 0.62 | 39:1 |
| 110 | 95 | 770 | " | 0.58 | 38:1 |
| 111 | 96 | 550 | air | 0.65 | 40:1 |
| 112 | 97 | 750 | " | 0.64 | 39:1 |
| 113 | 98 | 830 | " | 0.60 | 32:1 |
| 114 | 99 | 650 | " | 0.65 | 39:1 |
| 115 | 100 | 780 | $N_2$ gas | 0.63 | 39:1 |
| Comparative Example 3 | Comparative Example 2 | 770 | air | 0.44 | 9:1 |

Notes:
[1]Acicular particles of alpha-FeOOH containing Si, Cr, Ni and Mg coated with phosphorus compound and silicon compound.
[2]Acicular particles of alpha-$Fe_2O_3$ containing Si, Cr, Ni and Mg impregnated with phosphorus compound and silicon compound.

TABLE 11

Conditions in preparing the acicular ferromagnetic alloy particles and the specific properties thereof

| Classification | Particles of alpha-$Fe_2O_3$ obtained in[1] | Temperature of reduction(°C.) | Si/Fe (atomic %) | Cr/Fe (atomic %) | Ni/Fe (atomic %) | Mg/Fe (atomic %) | P/Fe (atomic %) | Length of major axis (μm) | Axial ratio (major:minor) | Specific surface area ($m^2/g$) | magnetization (emu/g) | force (Oe) |
|---|---|---|---|---|---|---|---|---|---|---|---|---|
| Example | Example | | | | | | | | | | | |
| 116 | 101 | 480 | 4.33 | 0.499 | 3.03 | 4.96 | 0.630 | 0.25 | 11:1 | 52.4 | 157.3 | 1551 |
| 117 | 102 | 460 | 3.89 | 0.497 | 5.00 | 3.00 | 0.469 | 0.45 | 20:1 | 50.4 | 164.5 | 1496 |
| 118 | 103 | 520 | 6.40 | 0.994 | 4.04 | 2.00 | 0.269 | 0.37 | 12:1 | 43.8 | 167.3 | 1303 |
| 119 | 104 | 420 | 1.98 | 0.294 | 2.00 | 6.95 | 0.787 | 0.40 | 15:1 | 51.0 | 142.3 | 1565 |
| 120 | 105 | 450 | 1.40 | 0.695 | 3.01 | 10.00 | 0.549 | 0.40 | 13:1 | 54.6 | 138.6 | 1458 |
| 121 | 106 | 470 | 0.64 | 0.398 | 1.98 | 14.94 | 0.629 | 0.34 | 13:1 | 48.8 | 133.4 | 1445 |
| 122 | 107 | 400 | 1.68 | 2.97 | 4.01 | 4.97 | 0.468 | 0.32 | 13:1 | 58.4 | 155.4 | 1410 |
| 123 | 108 | 540 | 7.91 | 0.298 | 3.00 | 1.01 | 0.157 | 0.31 | 12:1 | 42.2 | 154.2 | 1380 |
| 124 | 109 | 480 | 3.30 | 0.600 | 3.04 | 4.00 | 0.630 | 0.35 | 15:1 | 52.6 | 150.4 | 1503 |
| 125 | 110 | 490 | 3.75 | 0.496 | 3.00 | 5.05 | 0.312 | 0.35 | 15:1 | 51.7 | 154.6 | 1569 |
| 126 | 111 | 380 | 1.24 | 0.496 | 2.98 | 4.94 | 1.80 | 0.33 | 15:1 | 53.2 | 148.5 | 1573 |
| 127 | 112 | 470 | 4.20 | 0.495 | 2.99 | 4.98 | 0.627 | 0.30 | 15:1 | 50.4 | 154.9 | 1534 |
| 128 | 113 | 500 | 4.64 | 0.315 | 3.00 | 5.00 | 0.548 | 0.33 | 13:1 | 48.6 | 158.0 | 1500 |
| 129 | 114 | 450 | 3.15 | 0.496 | 3.02 | 5.01 | 0.629 | 0.34 | 14:1 | 52.9 | 152.0 | 1564 |
| 130 | 115 | 460 | 4.05 | 0.495 | 3.03 | 4.96 | 0.550 | 0.35 | 15:1 | 53.0 | 154.2 | 1552 |
| Comparative Example | Comparative Example | | | | | | | | | | | |

TABLE 11-continued

Conditions in preparing the acicular ferromagnetic alloy particles and the specific properties thereof Properties of particles of ferromagnetic alloy[2]

| Classification | Particles of alpha-Fe₂O₃ obtained in[1] | Temperature of reduction (°C.) | Si/Fe (atomic %) | Cr/Fe (atomic %) | Ni/Fe (atomic %) | Mg/Fe (atomic %) | P/Fe (atomic %) | Length of major axis (μm) | Axial ratio (major: minor) | Specific surface area (m²/g) | Magnetization (emu/g) | Coercive force (Oe) |
|---|---|---|---|---|---|---|---|---|---|---|---|---|
| 4 | 3 | 460 | 3.80 | — | — | — | 0.630 | 0.4 | 5:1 | 19.3 | 166.4 | 1013 |

Notes: [1]Acicular particles of alpha-Fe₂O₃ containing Si, Cr, Ni and Mg impregnated with phosphorus compound and silicon compound.
[2]Acicular ferromagnetic alloy particles containing Si, Cr, Ni, Mg and P impregnated with phosphorus compound and silicon compound.

TABLE 12

Kind of acicular ferromagnetic alloy particles and properties of magnetic tape

| Classification Example | Acicular ferromagnetic alloy particles obtained in Example | Coercive force (Oe) | Residual magnetic flux density (Br) (Gauss) | Squareness ratio (Br/Bm) | Orientation ratio[1] |
|---|---|---|---|---|---|
| 131 | 116 | 1454 | 3980 | 0.793 | 2.06 |
| 132 | 117 | 1402 | 4050 | 0.835 | 2.57 |
| 133 | 118 | 1204 | 3960 | 0.780 | 2.00 |
| 134 | 119 | 1471 | 4020 | 0.815 | 2.41 |
| 135 | 120 | 1396 | 3610 | 0.810 | 2.37 |
| 136 | 121 | 1390 | 3520 | 0.816 | 2.40 |
| 137 | 122 | 1364 | 3870 | 0.805 | 2.16 |
| 138 | 123 | 1295 | 3860 | 0.771 | 1.98 |
| 139 | 124 | 1400 | 3900 | 0.800 | 2.20 |
| 140 | 125 | 1470 | 3960 | 0.820 | 2.46 |
| 141 | 126 | 1485 | 4000 | 0.825 | 2.51 |
| 142 | 127 | 1452 | 4070 | 0.833 | 2.55 |
| 143 | 128 | 1405 | 3990 | 0.821 | 2.45 |
| 144 | 129 | 1480 | 4100 | 0.840 | 2.68 |
| 145 | 130 | 1476 | 4060 | 0.830 | 2.53 |
| Comparative Example | Comparative Example | | | | |
| 5 | 4 | 830 | 2640 | 0.657 | 1.57 |

Note:
[1]Orientation ratio is calculated by the formula:
$$\frac{(Br/Bm) \text{ parallel}}{(Br/Bm) \text{ perpendicular}}$$

What is claimed is:

1. Acicular ferromagnetic alloy particles for magnetic recording, comprising the acicular ferromagnetic alloy particles containing Si, Cr, Ni and P impregnated with phosphorus compound and silicon compound.

2. Acicular ferromagnetic alloy particles for magnetic recording according to claim 1, wherein said acicular ferromagnetic alloy particles containing Si, Cr, Ni and P further contain Mg.

3. A process for producing acicular ferromagnetic alloy particles for magnetic recording, comprising the steps of oxidizing Fe(OH)₂ in an aqueous suspension by blowing an oxygen-containing gas into said aqueous suspension of Fe(OH)₂ of pH of higher than 11 obtained by reacting an aqueous solution of a ferrous salt with an aqueous solution of an alkali metal hydroxide thereby obtaining acicular particles of alpha-FeOOH containing Si, Cr and Ni, a water-soluble silicate being added into said aqueous solution of an alkali metal hydroxide or into said aqueous suspension of Fe(OH)₂ before blowing said oxygen-containing gas in an amount of 0.1 to 1.7 atomic % (calculated as Si) to Fe of said ferrous salt and a water-soluble chromium salt and a water-soluble nickel salt being added into said aqueous solution of the ferrous salt, said aqueous solution of the alkali metal hydroxide, said aqueous suspension of Fe(OH)₂ before blowing the oxygen-containing gas thereinto, or said aqueous suspension of Fe(OH)₂ during oxidizing by blowing the oxygen-containing gas thereinto, in the respective amount of 0.1 to 5.0 atomic % (calculated as Cr) and 0.1 to 7.0 atomic % (calculated as Ni) to Fe of said ferrous salt, after collecting said acicular particles of alpha-FeOOH containing Si, Cr and Ni from the mother liquor and suspending the thus obtained particle in water, adding 0.1 to 2% by weight of a salt of phosphoric acid (calculated as PO₃) to said acicular particles of alpha-FeOOH containing Si, Cr and Ni in the thus formed aqueous suspension of pH of higher than 8, further adding 0.1 to 7.0% by weight of a water-soluble silicate (calculated as SiO₂) thereinto, and adjusting the pH of the thus prepared aqueous suspension to 3 to 7, thereby obtaining the acicular particles of alpha-FeOOH containing Si, Cr and Ni coated with a phosphorus compound and a silicon compound, after collecting said acicular particles by filtering and drying said acicular particles, subjecting the thus dried acicular particles of alpha-FeOOH containing Si, Cr and Ni coated with said phosphorus compound and said silicon compound to thermal treatment in a non-reducing atmosphere, thereby obtaining the acicular particles of alpha-$Fe_2O_3$ containing Si, Cr and Ni impregnated with said phosphorus compound and said silicon compound, subjecting the thus obtained acicular particles of alpha-$Fe_2O_3$ containing Si, Cr and Ni impregnated with said phosphorus compound and said silicon compound to thermal reduction in a reducing gas thereby obtaining acicular ferromagnetic alloy particles containing Si, Cr, Ni and P impregnated with phosphorus compound and silicon compound.

4. A process for producing acicular ferromagnetic alloy particles for magnetic recording according to claim 3, wherein a water-soluble magnesium salt is further added to said aqueous solution of said ferrous salt, said aqueous solution of said alkali metal hydroxide, said aqueous suspension of $Fe(OH)_2$ before blowing said oxygen containing gas therein, or said aqueous suspension of $Fe(OH)_2$ during blowing said oxygen-containing gas thereinto in an amount of 0.1 to 15.0 atomic % as Mg to Fe corresponding to said ferrous salt in said aqueous suspension of $Fe(OH)_2$, thereby oxidizing said ferrous salt into acicular particles of alpha-FeOOH containing Si, Cr, Ni and Mg, after collecting said acicular particles of alpha-FeOOH containing Si, Cr, Ni and Mg from the mother liquor and doping the surface thereof with both said phosphorus compound and said silicon compound, the thus obtained acicular particles of alpha-FeOOH containing Si, Cr, Ni and Mg coated with said phosphorus compound and said silicon compound are subjected to the thermal treatment, thereby obtaining the acicular particles of alpha-$Fe_2O_3$ containing Si, Cr, Ni and Mg impregnated with said phosphorus compound and silicon compound and the thus obtained acicular particles of alpha-$Fe_2O_3$ containing Si, Cr, Ni and Mg impregnated with said phosphorus compound and said silicon compound are subjected to thermal reduction in a reducing gas, thereby obtaining acicular ferromagnetic alloy particles containing Si, Cr, Ni, Mg and P impregnated with phosphorus compound and silicon compound.

5. A process for producing acicular ferromagnetic alloy particles for magnetic recording according to claim 3 or 4, wherein the temperature in said thermal reduction in said non-reducing atmosphere is in the range of 500° to 900° C.

6. A process for producing acicular ferromagnetic alloy particles for magnetic recording according to claim 3 or 4, wherein the temperature in said thermal reduction in said reducing gas is in the range of 350° to 600° C.

* * * * *